(12) United States Patent
Miyajima et al.

(10) Patent No.: US 7,659,691 B2
(45) Date of Patent: Feb. 9, 2010

(54) POWER SUPPLY UNIT

(75) Inventors: Yoichi Miyajima, Tokyo (JP); Hiroaki Sato, Kanagawa (JP)

(73) Assignee: Sony Corporation (JP)

( * ) Notice: Subject to any disclaimer, the term of this patent is extended or adjusted under 35 U.S.C. 154(b) by 449 days.

(21) Appl. No.: 11/311,654

(22) Filed: Dec. 20, 2005

(65) Prior Publication Data

US 2006/0145656 A1    Jul. 6, 2006

(30) Foreign Application Priority Data

Dec. 28, 2004    (JP) .................... P2004-379987

(51) Int. Cl.
*H02J 7/00*    (2006.01)
(52) U.S. Cl. .................. 320/112; 320/107; 320/113
(58) Field of Classification Search .......... 320/107, 320/112–115; 396/277–279; 348/372, 373–376
See application file for complete search history.

(56) References Cited

U.S. PATENT DOCUMENTS

| | | | |
|---|---|---|---|
| 4,427,280 A * | 1/1984 | Iwashita et al. | 396/303 |
| 5,164,761 A * | 11/1992 | Isono et al. | 396/279 |
| 5,517,277 A * | 5/1996 | Goto et al. | 396/281 |
| 5,592,064 A * | 1/1997 | Morita | 320/110 |
| 6,101,339 A * | 8/2000 | Miki et al. | 396/301 |
| 6,563,713 B2 * | 5/2003 | Yang | 361/752 |
| 6,605,923 B1 * | 8/2003 | Kellogg | 320/112 |
| 6,737,190 B2 * | 5/2004 | Chaya | 429/100 |
| 6,806,681 B1 * | 10/2004 | Cheiky et al. | 320/107 |
| 7,151,356 B1 * | 12/2006 | Chen | 320/107 |
| 7,354,301 B2 * | 4/2008 | Noguchi et al. | 439/500 |

FOREIGN PATENT DOCUMENTS

| | | |
|---|---|---|
| JP | 6-132021 | 5/1994 |
| JP | 10-84188 | 3/1998 |
| JP | 11-3692 | 1/1999 |
| JP | 11-307072 | 11/1999 |
| JP | 2001-76700 | 3/2001 |
| JP | 2003-317689 | 11/2003 |

* cited by examiner

*Primary Examiner*—Edward Tso
*Assistant Examiner*—Richard V Muralidar
(74) *Attorney, Agent, or Firm*—Finnegan, Henderson, Farabow, Garrett & Dunner, L.L.P.

(57) ABSTRACT

A power supply unit for extending a function of an apparatus (image pickup apparatus) unloadably loaded with a flat parallelopiped battery having a roughly square principal surface includes the flat battery, and a power supply (for example, a control grip including a cell or cells and a control portion which includes a power supply button, a shutter button, a zoom switch) electrically connected to the flat battery through a plate having the same shape as that of the flat battery and detachably mounted, projected portions are formed at both ends in the longitudinal direction of a back surface opposite to an insertion surface of the plate, along the back surface, and one of the projected portions is formed with a locked surface to be locked by a lock means (lock pawl) possessed by the apparatus, whereby mis-insertion of the plate into the apparatus is prevented, and a function of the apparatus is extended.

8 Claims, 21 Drawing Sheets

FIG. 7
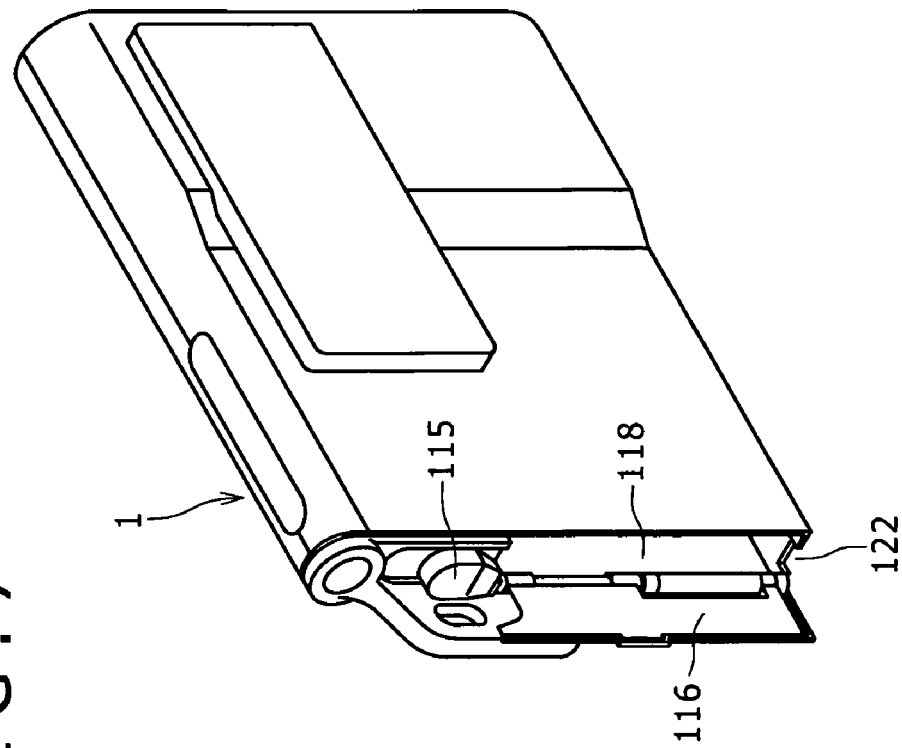
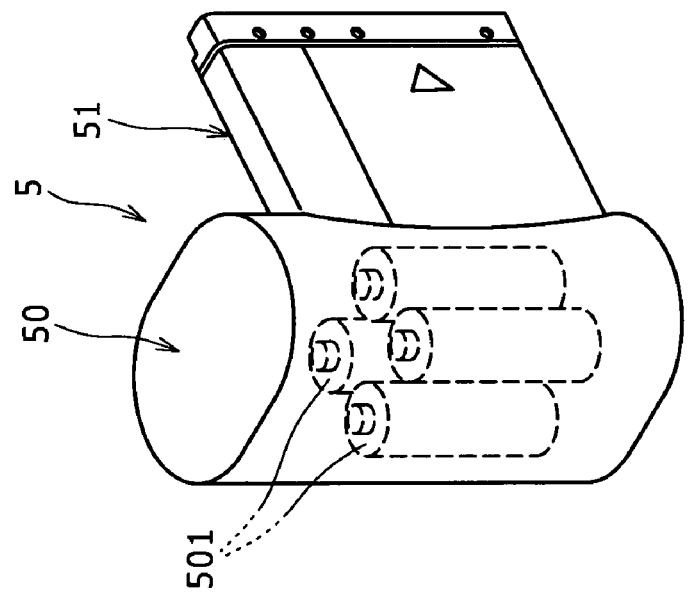

FIG. 8
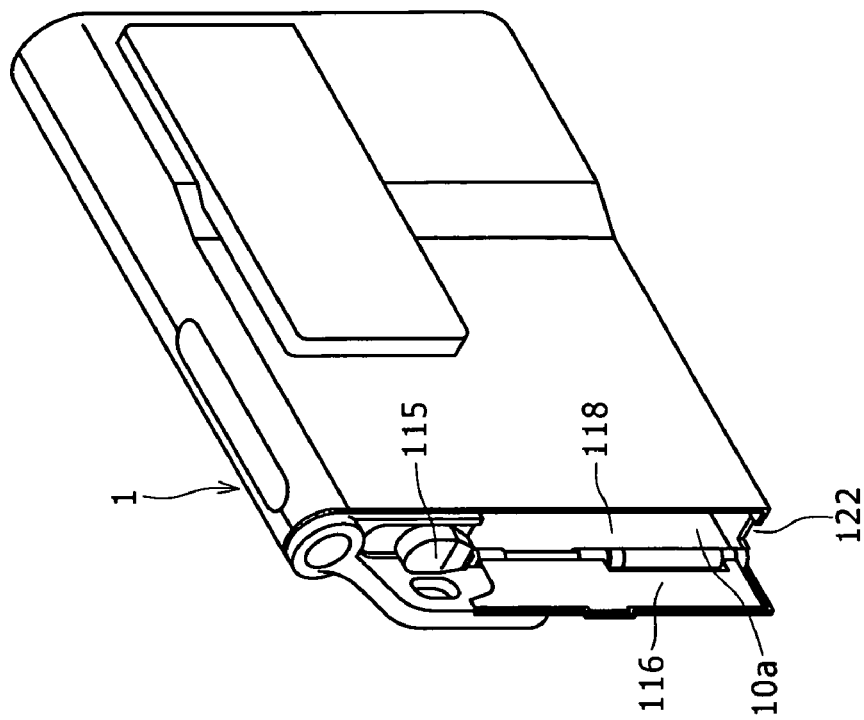
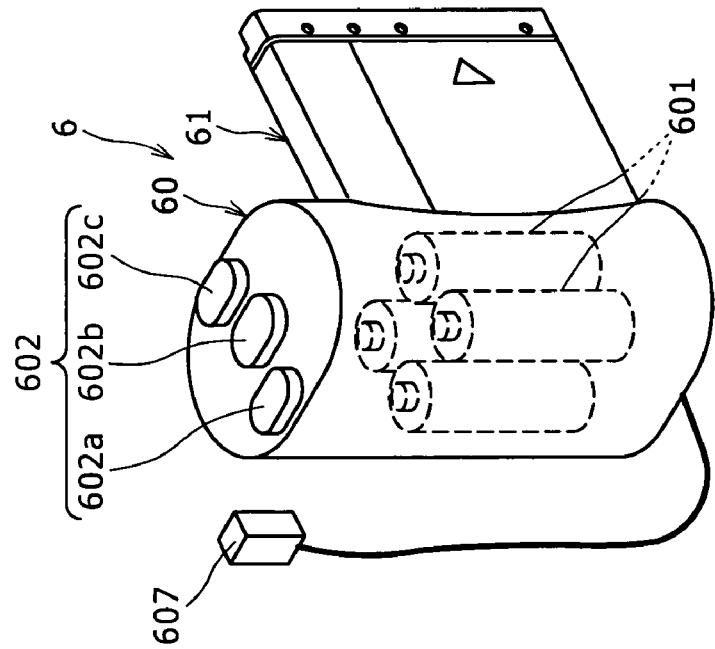

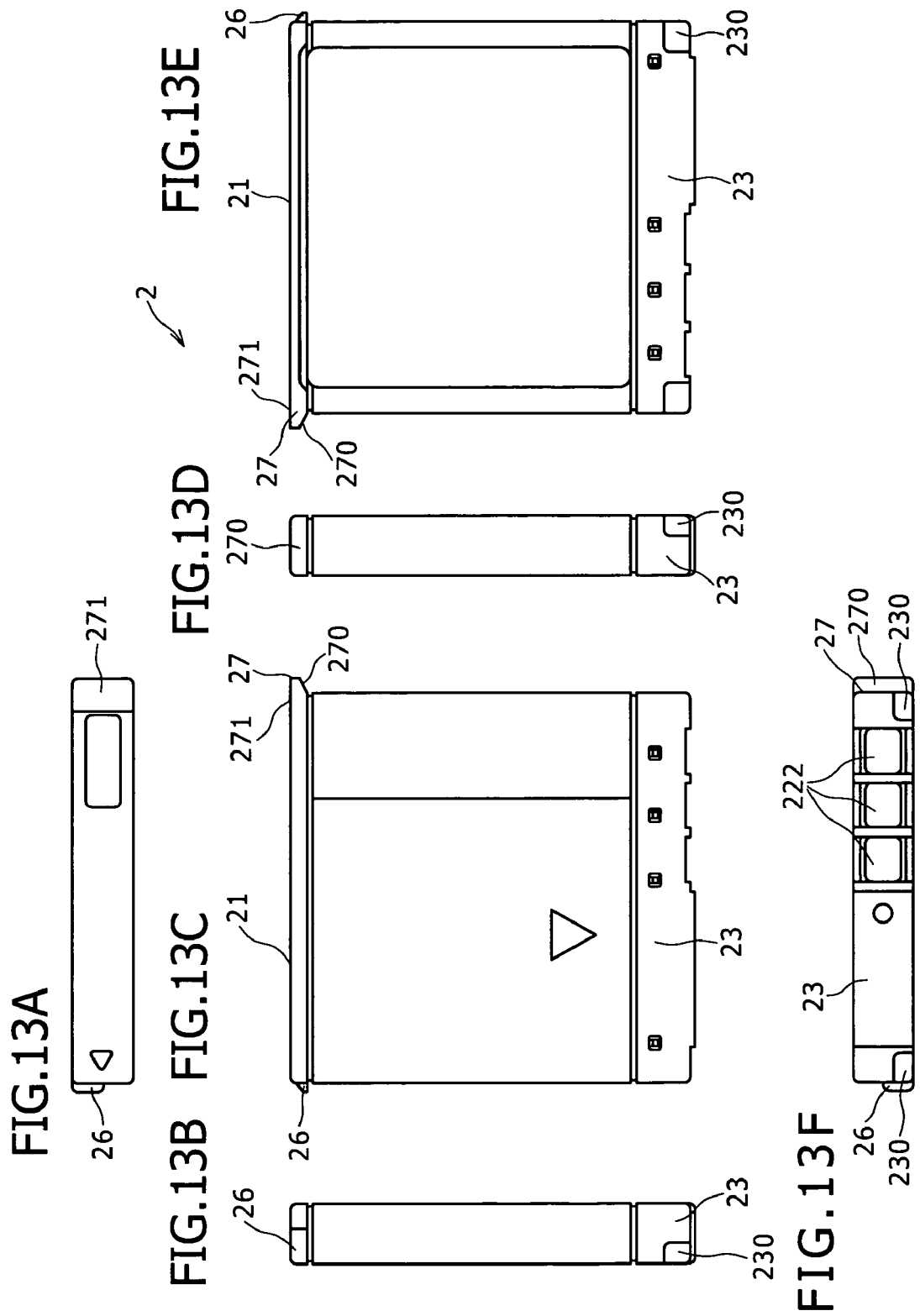

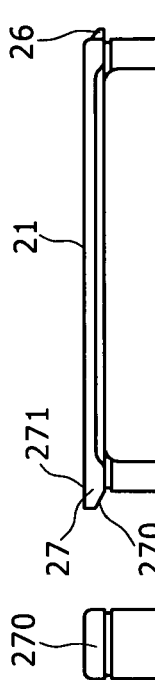
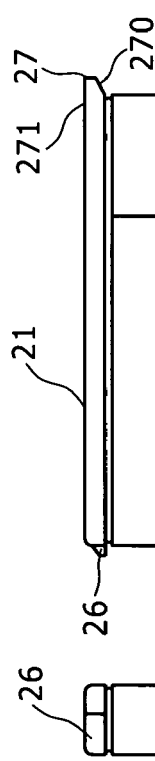
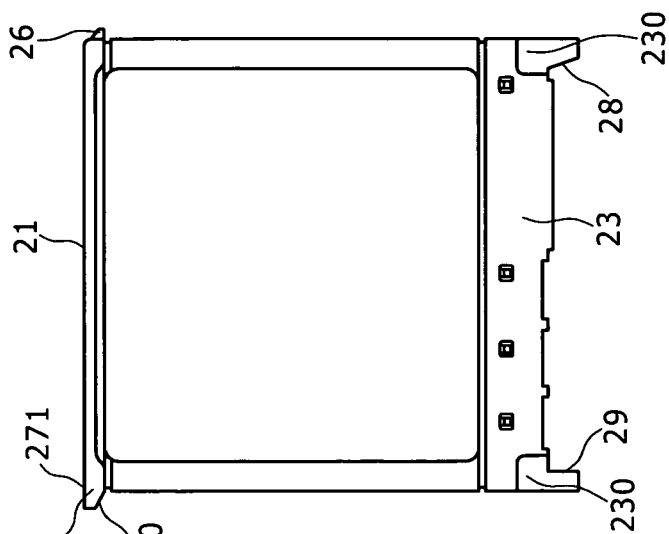
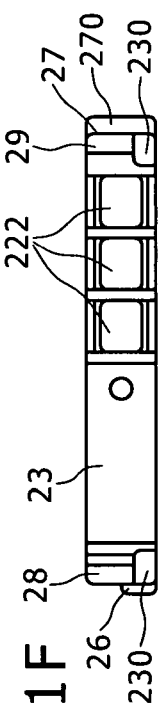
FIG.21A FIG.21B FIG.21C FIG.21D FIG.21E FIG.21F

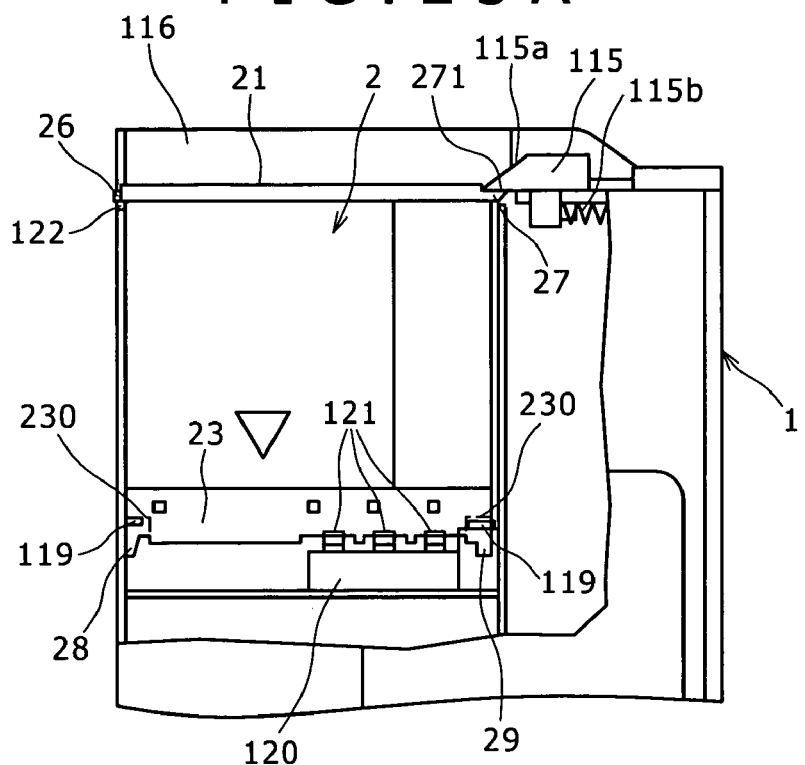
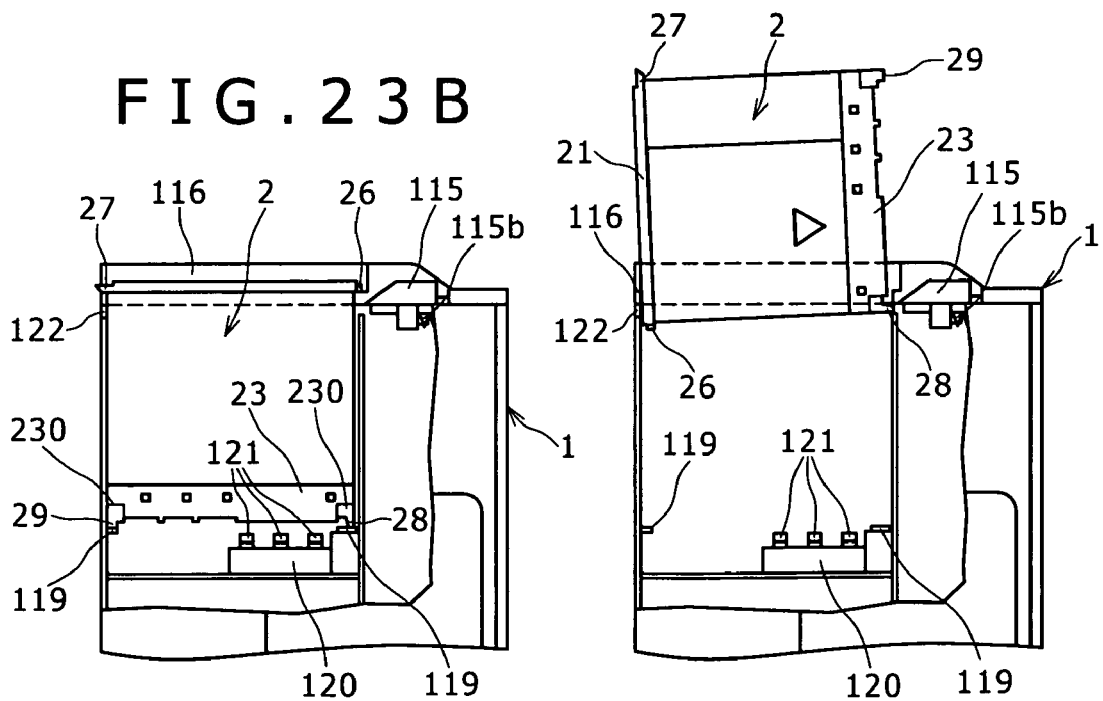

POWER SUPPLY UNIT

CROSS REFERENCES TO RELATED APPLICATIONS

The present invention contains subject matter related to Japanese Patent Application JP 2004-379987 filed in the Japanese Patent Office on Dec. 28, 2004, the entire-contents of which being incorporated herein by reference.

BACKGROUND OF THE INVENTION

The present invention relates to a power supply unit for extending a function of an apparatus detachably provided with a power supply.

In recent years, attendant on the reductions in size and weight of image pickup apparatuses represented by digital cameras, the batteries mounted in the image pickup apparatuses have come to be formed in rectangular parallelopiped shapes which are advantageous for reductions in size and weight. In the case of an image pickup apparatus to which a battery is applied, for preventing mis-insertion of the battery or breakage of the image pickup apparatus, it is desirable to form the image pickup apparatus by use of a member or members rigid enough to endure bending moments, which has been impeding the reductions in size and weight.

In view of the above, as shown in FIG. 25, the battery 14 described in Japanese Patent Laid-Open No. 2003-317689 is formed in a rectangular parallelopiped shape in which the length of the edges in the insertion direction is set greater than the length of the edges in the width direction for the purpose of preventing mis-insertion into the image pickup apparatus, and an armor 140 is provided with notches 141 at edges thereof, whereby the mis-insertion is prevented assuredly, and it is made easier to reduce the size and weight of the image pickup apparatus or the like to which the battery 14 is mounted. The armor 140 is provided with terminals 142 to be electrically connected to terminals of the image pickup apparatus into which the battery 14 is to be mounted. The number and the locations of the notches 141 are so determined that the end face 143 does not have a center of symmetry. On the other hand, a cell holder in the image pickup apparatus for storing the battery has an internal shape substantially the same as the external shape of the armor 140, and is provided with projected portions for engagement with the notches 141, 141 when the battery 14 is stored in the cell holder. Incidentally, batteries of the same type as the battery described in Japanese Patent Laid-Open No. 2003-317689 are described in Japanese Patent Laid-Open Nos. Hei 11-307072, 2001-76700, and Hei 11-3692.

In the case of extending a function of an apparatus detachably provided with a battery, as in the case of the image pickup apparatus described in Japanese Patent Laid-Open No. Hei 6-132021, for example, a functional variation is added in the thickness direction of the apparatus.

SUMMARY OF THE INVENTION

Nowadays, due to the request for further reductions in size and weight of apparatuses detachably provided with batteries, such as image pickup apparatuses, it is desired to further reduce the size of the batteries. In order to further reduce the size of the rectangular parallelopiped battery, it may suffice to form the battery in a shape having roughly square surfaces opposite to each other. However, the batteries in the past have had no projected portions in their side surfaces, and, on the side of the apparatus, a lock portion for locking the battery loaded in the apparatus has not been clear. Therefore, it has been highly probable that the user would be puzzled about the positional relationship between the battery and the locking portion and would mis-insert the battery into the apparatus.

In addition, if a battery having roughly square surfaces is formed, when terminal contacts of the battery and the image pickup apparatus are off-center, there arises the following problem. In the condition where the battery is inserted face side back or mis-inserted sideways, the terminals of the battery and the terminals of the apparatus do not make contact with each other and they are not electrically connected, but the battery casing would make contact with the terminals of the apparatus, possibly breaking or damaging the terminals of the apparatus.

Furthermore, in the case of extending a function of the apparatus as above-mentioned, it may be necessary to add a functional variation in the thickness direction of the apparatus, so that it may be necessary to design the apparatus side taking into account the functional variation added. Besides, a set using a DC plate in the apparatus may need a cap for a DC cable (Japanese Patent Laid-Open No. Hei 10-84188), leading to an increase in the number of component parts, an enlarged apparatus size, and an increase in manufacturing cost. These points have hampered reductions in the size and weight of the apparatus.

Thus, there is a need to provide a power supply unit by which a function of an apparatus detachably fitted with a power supply can be extended, in a compact form and at low cost, while preventing mis-insertion of the power supply into the apparatus which might occur attendant on a reduction in the size of the power supply.

In order to meet the above need, according to an embodiment of the present invention, there is provided a power supply unit for extending a function of an apparatus unloadably loaded therein with a flat roughly rectangular parallelopiped battery. The power supply unit includes the flat roughly rectangular parallelopiped battery inserted in the apparatus, and a battery electrically connected to a back surface opposite to an insertion surface of the battery. Projected portions are formed at both ends in the longitudinal direction of the back surface along the back surface, and locked portions to be locked by the apparatus are formed at connection portions of both the batteries. By the power supply unit, it is possible to prevent mis-insertion of the battery into the apparatus and to supply the apparatus with a greater capacity of battery power supply than that of the battery.

According to another embodiment of the present invention, there is provided a power supply unit for extending a function of an apparatus unloadably loaded therein with a flat roughly rectangular parallelopiped battery. The power supply unit includes a power supply which has a predetermined function and which is electrically connected to the battery through a DC plate having a DC terminal formed in the same shape as that of the battery and is detachably provided. Projected portions are formed at both ends in the longitudinal direction of a back surface opposite to an insertion surface of the plate along the back surface, and one of the projected portions is provided with a locked surface to be locked by the apparatus. By the power supply unit, mis-insertion of the plate into the apparatus is prevented, and a function of the apparatus is extended.

Preferably, the power supply having the predetermined function is a power supply having a function by which a commercial power supply can be converted to a DC power supply.

Preferably, the power supply having the predetermined function includes an AC adapter as the function by which the commercial power supply can be converted to the DC power supply, the AC adapter is electrically connected to the vicinity of the other one of the projected portions of the DC plate through a cable, and the cable can be drawn out through a cutout portion provided in the apparatus for storing and exposing the other one of the projected portions when the DC plate is mounted to the apparatus. Therefore, on the side of the apparatus, there is no need for a special cap for a DC cable.

Preferably, the power supply having the predetermined function is a grip including a cell, and the grip detachably includes a primary cell or a secondary cell as the cell.

Preferably, the power supply having the predetermined function is a grip including a cell and used for operating the apparatus, and the grip is detachably includes a primary cell or a secondary cell as the cell. Examples of the operational function include turning ON and OFF of the power supply of the apparatus, a shutter function, and zooming.

Preferably, the battery has a roughly square principal surface.

Therefore, according to the power supply unit of the present invention, the function of the apparatus detachably fitted with the power supply can be extended while preventing mis-insertion of the battery into the apparatus which might occur attendant on a reduction in the size of the power supply.

In addition, since the power supply unit according to the present invention is detachably provided by the lock means provided in the apparatus for locking a standard power supply (a battery having a flat rectangular parallelopiped shape with a roughly square principal surface), it is needless on the apparatus side to secure a special component part or space for mounting the power supply, so that the function of the apparatus can be extended in a compact form and at low cost.

BRIEF DESCRIPTION OF THE DRAWINGS

FIG. 7 illustrates the points in inserting a power supply unit having a cell incorporating grip into an image pickup apparatus;

FIG. 8 illustrates the points in inserting a power supply unit having an operating grip into an image pickup apparatus;

FIGS. 13A to 13F schematically show the outlook of an embodiment of a battery to be mounted in an image pickup apparatus, in which FIGS. 13A to 13F schematically show side surfaces of the battery according to the embodiment;

FIGS. 21A to 21F schematically show the outlook of an embodiment of a battery to be mounted in an image pickup apparatus, in which FIGS. 21A to 21F schematically show side surfaces of the battery according to the embodiment;

FIG. 23A illustrates a battery inserting operation, and FIGS. 23B and 23C illustrate a battery mis-insertion preventive operation;

DETAILED DESCRIPTION OF THE PREFERRED EMBODIMENTS

Figure 1:
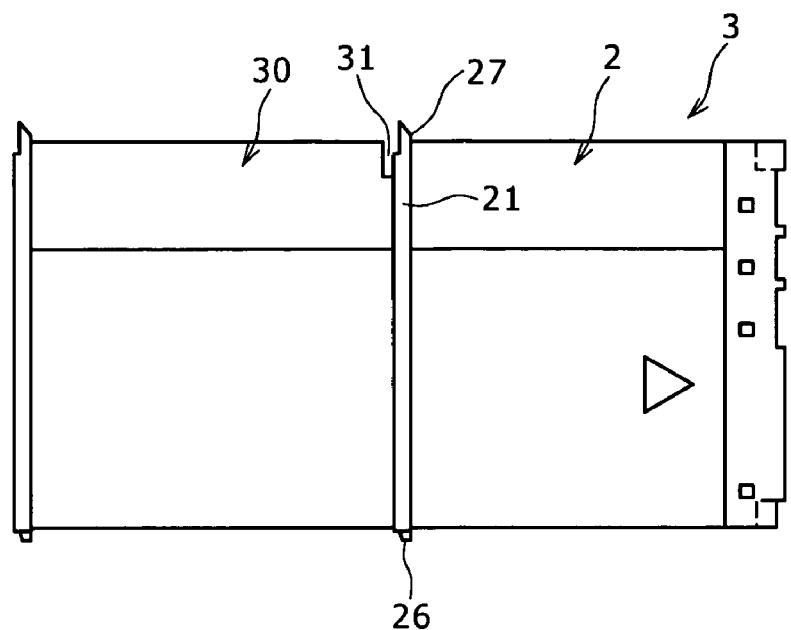
FIG. 1 schematically shows an embodiment of a power supply unit according to the present invention.

Now, embodiments of the present invention will be described below referring to the drawings.

FIGS. 1 to 4 schematically show an embodiment of a power supply unit according to the present invention.

Figure 12A:
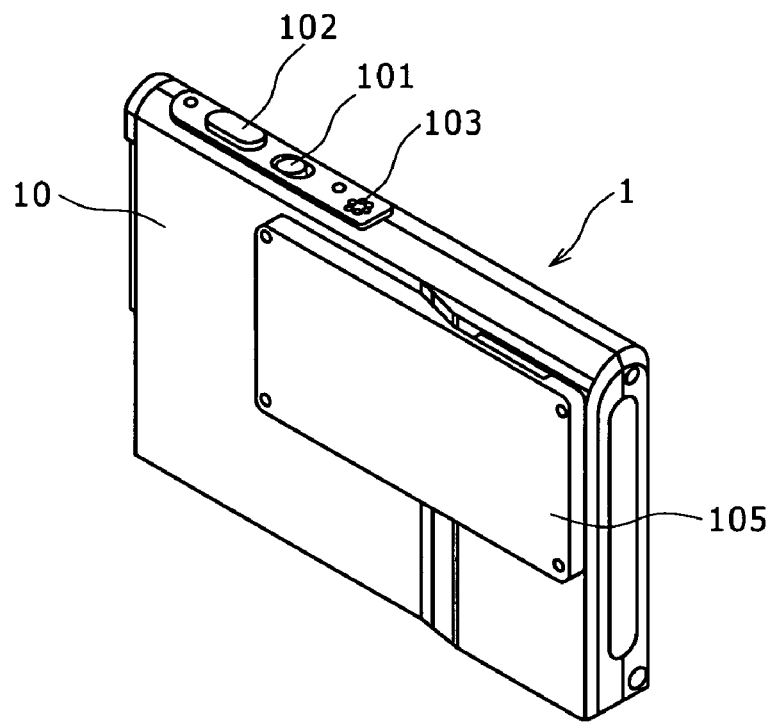
FIGS. 12A and 12B schematically show the outlook of an embodiment of an image pickup apparatus loaded with a battery according to the present invention, in which FIG. 12A schematically shows the outlook of a front surface of the image pickup apparatus, and FIG. 12B schematically shows the outlook of a back surface of the image pickup apparatus.
Figure 12B:
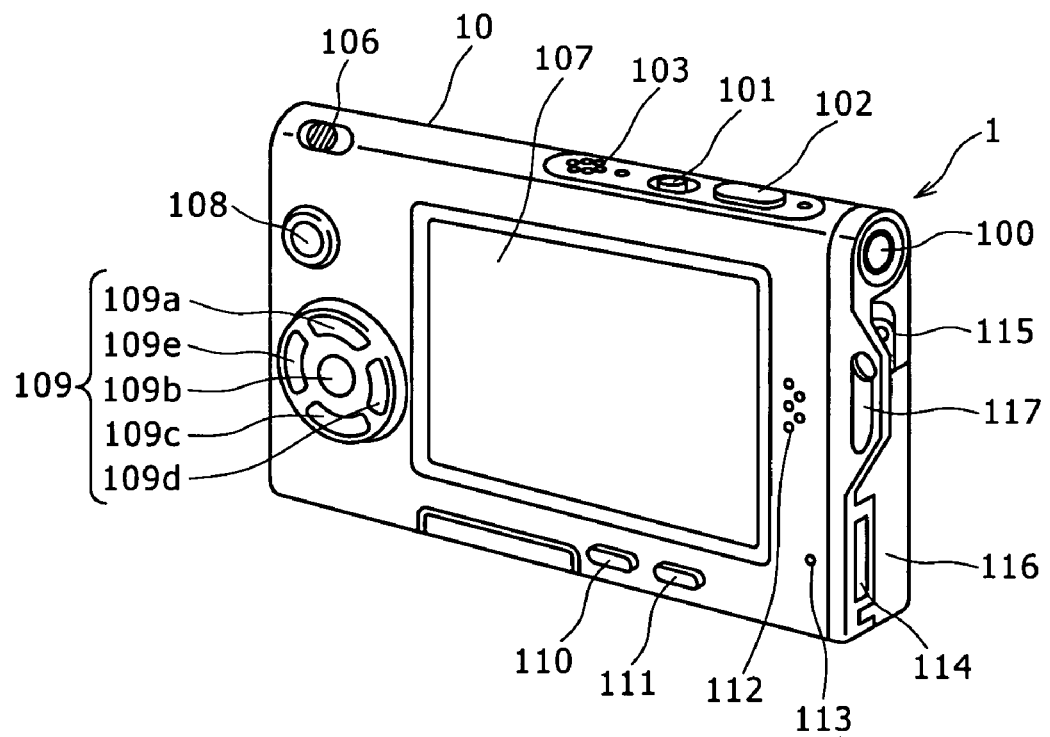
Figure 14:
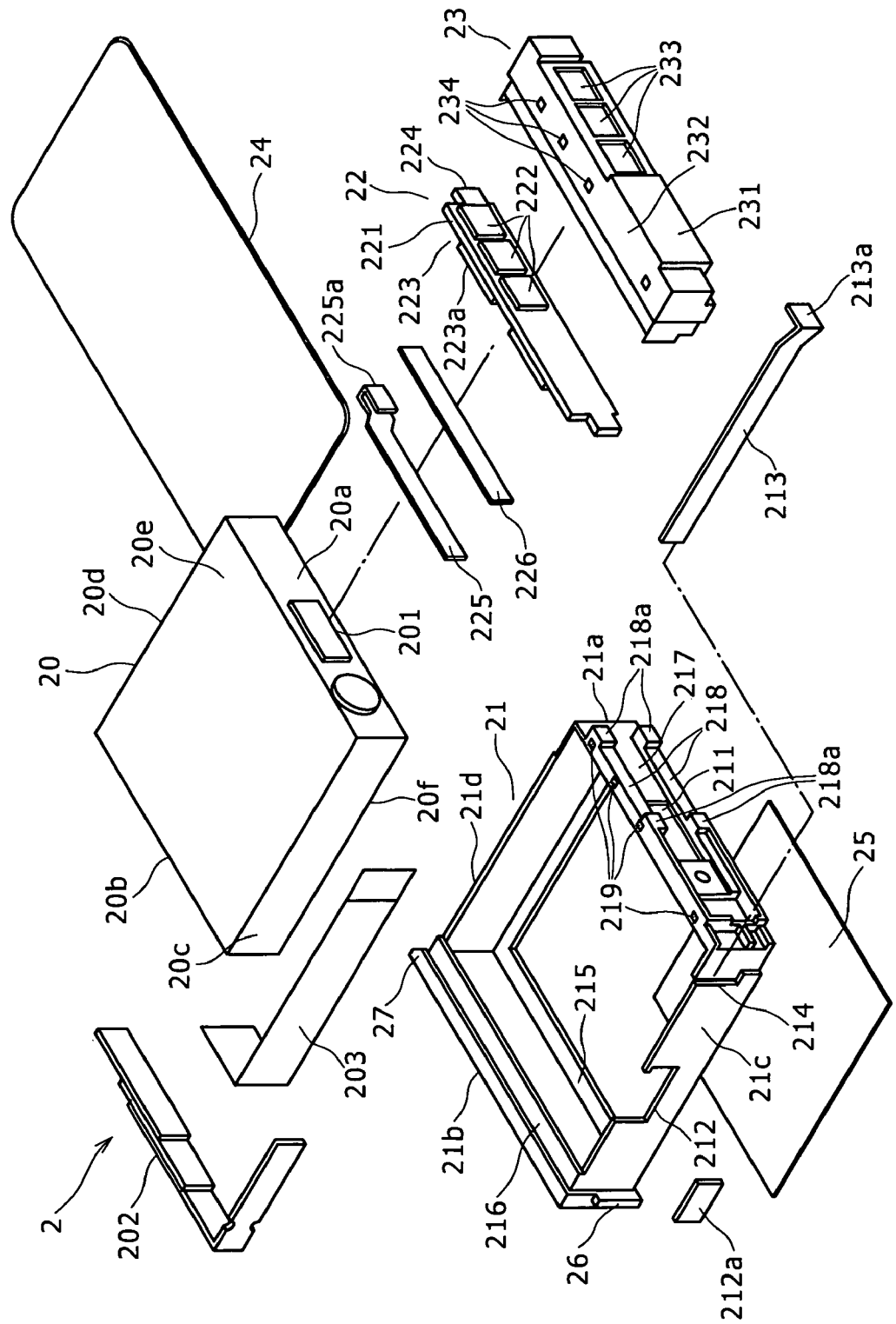
FIG. 14 is an exploded perspective view of the battery.
Figure 15:
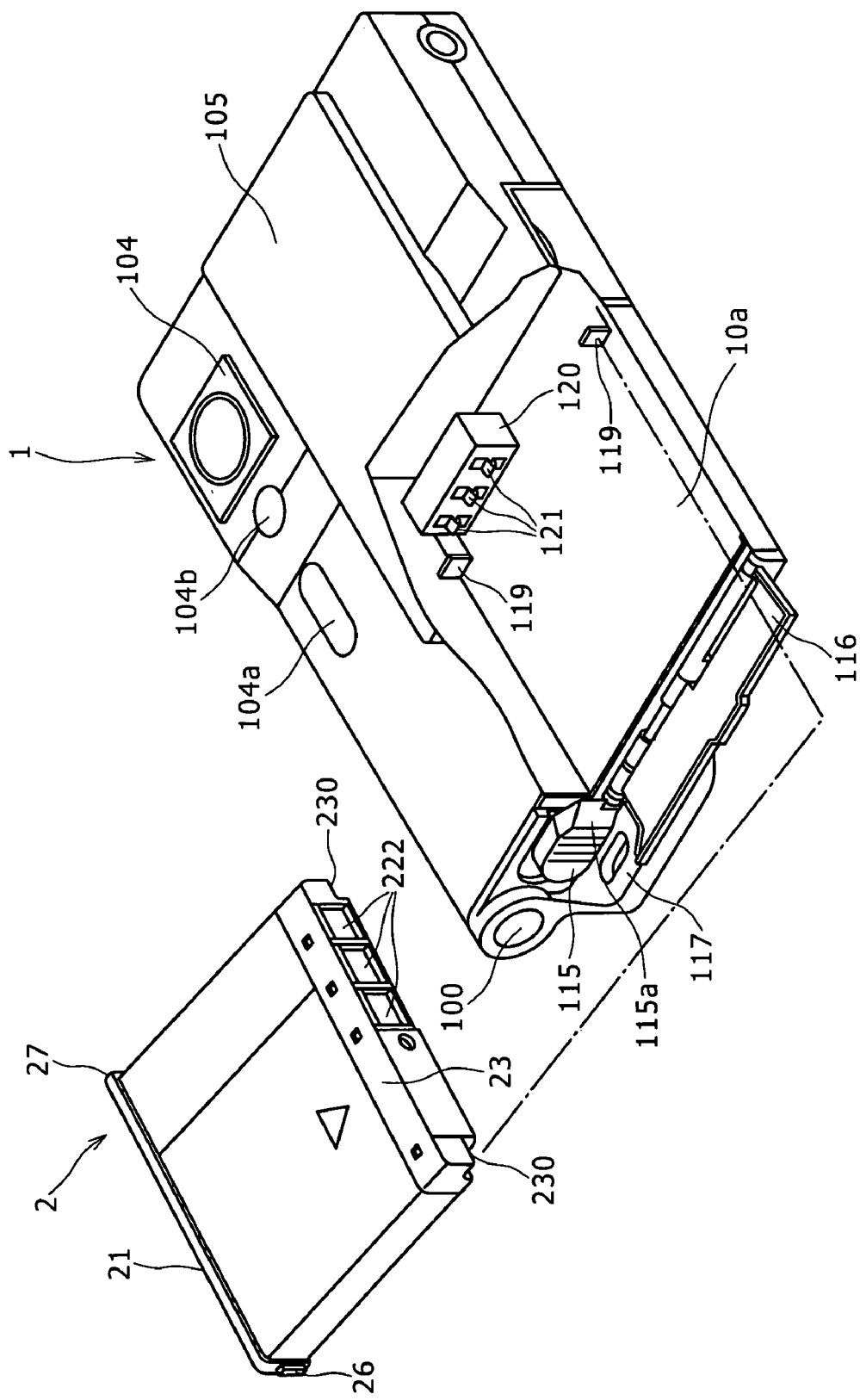
FIG. 15 schematically shows the inside of the image pickup apparatus in which the battery is to be stored.
Figure 16:
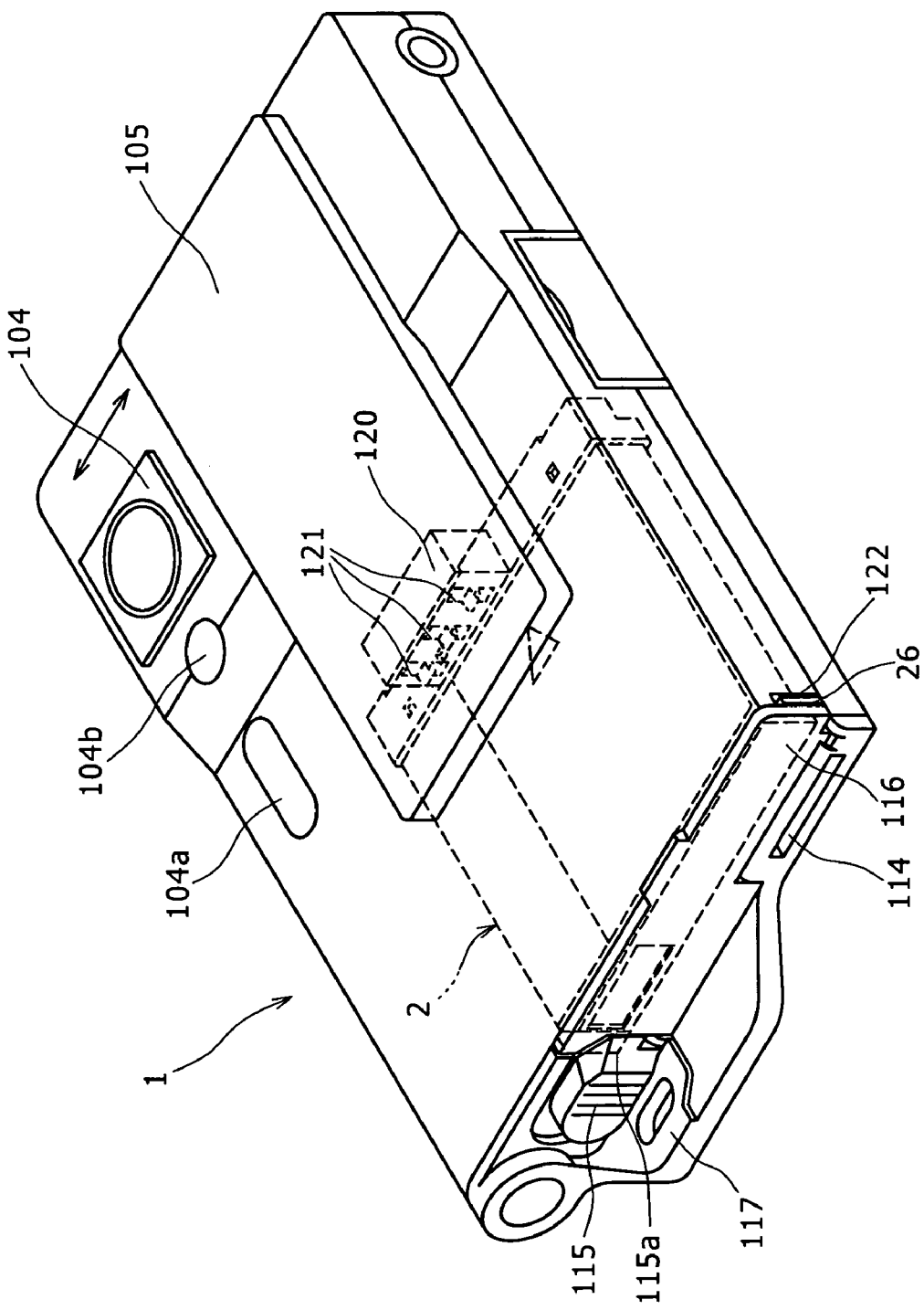
FIG. 16 schematically shows the condition where the image pickup apparatus is loaded with the battery.
Figure 17:
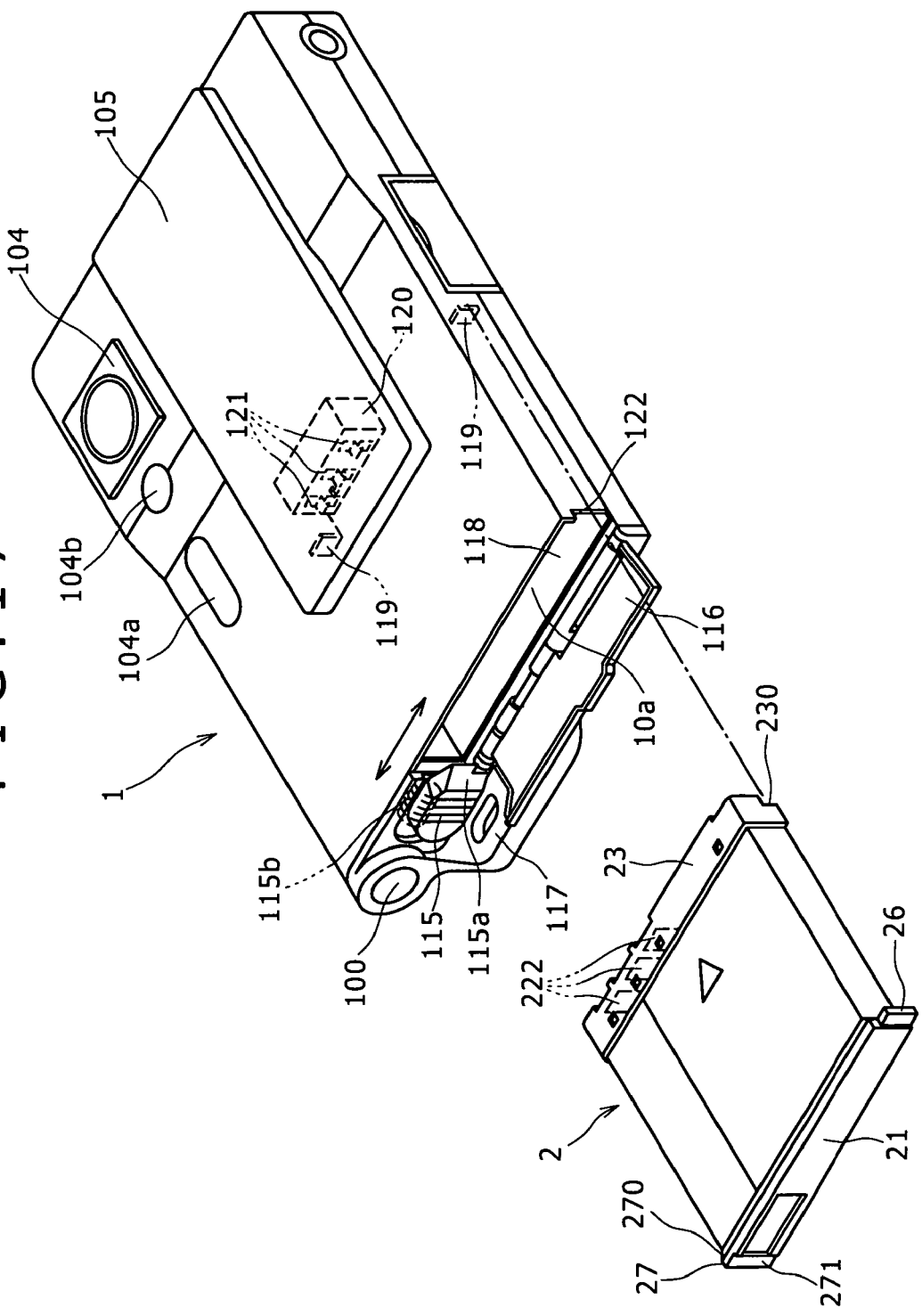
FIG. 17 illustrates the points in inserting the battery into the image pickup apparatus.

In addition, FIGS. 12A and 12B schematically shows the outlook of an embodiment of an image pickup apparatus to be loaded with the power supply unit, in which FIG. 12A schematically shows the outlook of a front surface of the image pickup apparatus, and FIG. 12B schematically shows the outlook of a back surface of the image pickup apparatus. FIGS. 13A to 13F schematically show the outlook of an embodiment of a battery to be mounted in the image pickup apparatus, in which FIGS. 13A to 13F schematically show the outlook of side surfaces of the battery according to the embodiment. FIG. 14 is an exploded perspective view of the battery. FIG. 15 schematically shows the inside of an image pickup apparatus to be loaded with a battery. FIG. 16 schematically shows the condition where the image pickup apparatus is loaded with the battery. FIG. 17 illustrates the points in inserting a battery into an image pickup apparatus.

An image pickup apparatus 1, as shown in FIG. 12A, includes a zoom lever 101, a shutter button 102 and a microphone 103 at an upper surface portion of a main body 10. At a front surface portion, an image pickup lens 104, a flash 104a, an AF illuminator 104b and a lens cover 105 are provided, as shown in FIG. 15. The lens cover 105 covers the image pickup lens 104, the flash 104a and the AF illuminator 104b in a slide system. The AF illuminator 104b is for emitting auxiliary light for focusing in a dark place.

In addition, as shown in FIG. 12B, at a back surface portion of the main body 10 are provided a mode changeover switch 106, a monitor 107, a menu button 108, a control button 109, a screen display button 110, a screen size selection/screen deletion button 111, a loudspeaker 112, and a reset button 113. The control button 109 is composed of a flash mode button 109a, a review button 109b, a self timer button 109c, a macro button 109d, and a determination button 109e. As these components, those provided in existing camera apparatuses (for example, Sony's digital camera DSC-T3) may be adopted.

Furthermore, the image pickup apparatus 1 has a storage portion 10a for storing a battery 2, as shown in FIG. 15. As shown in FIG. 16, at a side surface portion on the battery insertion side are provided a power supply button 100, a multiple terminal 114, a lock pawl 115 as a means for locking the battery 2 when the battery 2 is inserted and mounted in the image pickup apparatus 1, a lid 116 as a means for sealing the battery 2 mounted, a strap metal 117 for retaining the image pickup apparatus 1, and an opening portion 118 (FIG. 17) for accepting the battery 2. Incidentally, the strap metal 117 functions also for making it easy to put a thumb at the time of shooting.

At the storage portion 10a are provided ribs 119 and a terminal plate 120. The terminal plate 120 includes terminals 121 having spring-like elasticity. The ribs 119 make contact with recessed portions 230 (FIG. 13) formed in the battery 2 when the battery 2 is stored in the storage portion 10a. The terminals 121 come into electrical connection with terminal contact portions 222 (FIG. 13) of the battery 2 when the battery 2 is stored in the storage portion 10a.

Figure 24:
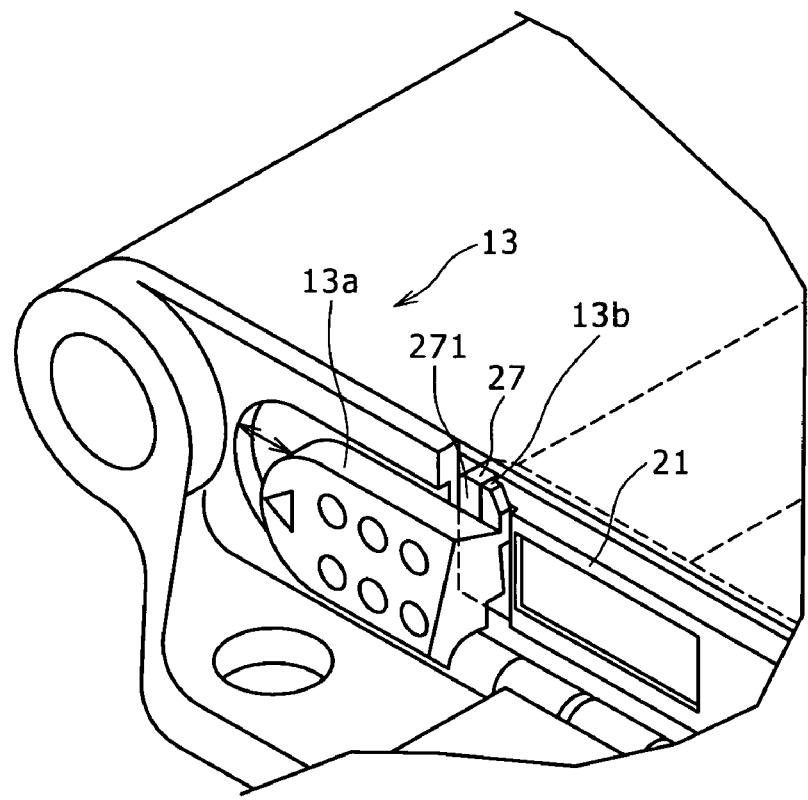
FIG. 24 schematically shows an embodiment of a lock pawl.
Figure 25:
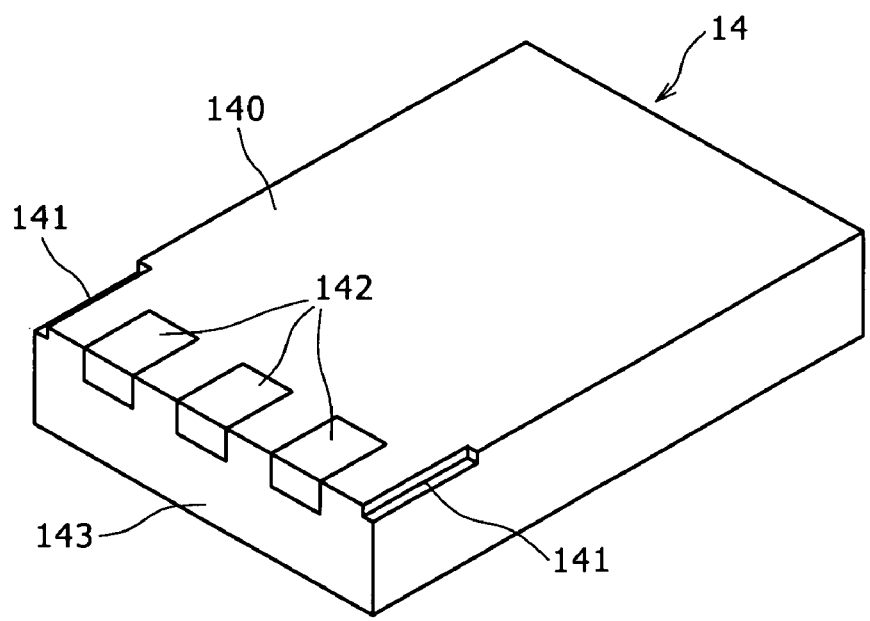
FIG. 25 schematically shows a battery according to the related art.

The lock pawl 115 is provided to be movable in the direction of arrows in FIG. 17, and is biased toward the opening portion 118 by a spring 115b. The lock pawl 115 has an inclined surface 115a. The inclined surface 115a is for augmenting the discharge amount of the battery 2. Specifically, at the time of discharging the battery 2 from the image pickup apparatus 1, the lock pawl 115 pushed by the contact pressure of the spring 115b is caused, by the inclined surface 115a thereof, to come under a projected portion 27 formed at a frame portion 21 of the battery 2, whereby the discharge of the battery 2 is accelerated. Incidentally, it suffices that the lock pawl 115 can lock the battery 2 mounted in the image necessarily have the inclined surface 115a. Specifically, the lock pawl may be formed as shown in FIG. 24. In this reciprocally movable by elastic deformation of a spring configured in the same manner as the spring 115b. The lock portion 13a further includes an auxiliary lock portion 13b.

On the other hand, as shown in FIG. 14, the battery 2 includes a cell 20 having a roughly square principal surface, a rectangular frame portion 21 storing the cell 20 therein, a circuit board portion 22 disposed on the outside surface of the frame portion 21, a cap portion 23 mounted to one end side of the frame portion 21 and the cell 20 so as to clamp the circuit board portion 22 between itself and the outside surface of the frame portion 21, and an enveloping film 24 for integrally covering the cell 20 and the frame portion 21.

The cell 20 has a configuration in which a laminate body (cell element) formed by laminating, for example, a positive electrode, separators, a negative electrode and the like is covered by a film-like enveloping member. As shown in FIG. 14, the cell 20 is formed in a flat roughly rectangular parallelopiped shape composed of first to fourth side surfaces 20a to 20d and face and back surfaces 20e and 20f. A cell positive electrode portion 201 is projectingly formed at a roughly central portion of the first side surface 20a, and a cell negative electrode portion (not shown) is formed at a central portion of the second side surface 20b opposite to the first side surface 20a. One end portion of a positive temperature coefficient thermistor (hereinafter referred to as PTC tab) 202 as a safety component part for interrupting conduction at the times of high temperature is connected to the cell negative electrode portion, and the other end portion of the PTC tab 202 extends to the third side surface 20c of the cell 20. An insulating paper 203 is interposed between the third side surface 20c of the cell 20 and the PTC tab 202.

The frame portion 21 is formed in a tetragonal frame-like shape from an electrically insulating synthetic resin so that first to fourth sides 21a to 21d thereof are overlapped respectively with the outside surfaces of the first to fourth side surfaces 20a to 20d of the cell 20.

A cell positive electrode fitting window 211 for fitting with a cell positive electrode portion 201 is provided at a first side 21a of the frame portion 21 to be overlapped with the first side surface 20a of the cell 20. A third side 21c to be overlapped with the third side surface 20c of the cell 20 is provided with a cutout 212 on which the PTC tab 202 fronts, and a slit 214 for introducing a negative electrode tab 213 to the inside of the third side 21c is provided at an end portion on the first side 21a side of the third side 21c. A spacer 212a is mounted to the cutout 212.

A flange-like projected portion 215 for supporting a bottom portion of the cell 20 is provided at a bottom portion of the frame portion 21. In addition, a flange-like projected portion 216 opposed to the flange-like projected portion 215 is formed at an upper portion of the frame portion 21 along the upper edge of the second side 21b, and an end portion on the second side surface 20b side of the cell 20 is clamped between these flange-like projected portions 215 and 216.

The height of the second side 21b of the frame portion 21 is set substantially equal to the height (material thickness) of the stored cell 20 when the cell 20 is most expanded at the time of charging or at the times of high temperature.

The first side 21a of the frame portion 21 is provided at its outside surface with a circuit board mount portion 217. The circuit board mount portion 217 is formed between an upper-lower pair of cap support portions 218, which are projectingly formed at the upper and lower ends of the outside surface of the first side 21a of the frame portion 21. The cap support portions 218 are provided with a plurality of cap portion lock pawls 219.

The circuit board portion 22 includes a plurality of terminal contact portions 222 on the outside surface side of a base plate 221 formed from an insulating synthetic resin such as glass epoxy phenol, electronic component parts and a transfer mold 223 with the electronic component parts molded are provided on the inside surface side of the base plate 221, and are mounted and fixed in the state of being clamped between the frame portion 21 and the cap portion 23 in the condition where a predetermined (slight) gap is maintained between the tip end of the transfer mold 223 and the frame portion 21.

One end portion 225a of a positive electrode tab 225 is connected by welding to a terminal portion 224 at one end of the circuit board portion 22. The other end side of the positive electrode tab 225 is connected by welding to a cell positive electrode portion 201 of the cell 20. An insulating paper 226 is interposed between the circuit board portion 22 and the positive electrode tab 225. Besides, one end 213a of the negative electrode tab 213 is connected by welding to a terminal portion 227 at the other end of the circuit board portion 22.

The positive electrode tab 225 is formed of a metallic plate, such as a nickel plate, which is roughly L-shaped. The metallic plate has been subjected to the so-called annealing, and is therefore easy to bend. The roughly L-shaped positive electrode tab 225 is connected to the positive electrode tab 225 on the side of its longer side, and is connected to the terminal portion 227 at the end of the circuit board portion 22 on the side of its shorter side.

Like the positive electrode tab 225, the negative electrode tab 213 is also formed of a metallic plate, such as a nickel plate, which is roughly L-shaped. Of the roughly L-shaped negative electrode tab 213, one end 213 on the side of the shorter side is connected to the terminal portion 227 at the other end of the circuit board portion 22. The other end 213b on the side of the longer side of the negative electrode tab 213 is introduced to the inside surface side of the frame portion 21 through the slit 214 provided in the third side 21c of the frame portion 21, and is connected to the PTC tab 202.

The cap portion 23 includes a rectangular end face portion 231 to be overlapped with the outside surface of the first side 21a of the frame portion 21 through the circuit board portion 22 (with the circuit board portion 22 therebetween) mounted to the circuit board mount portion 217, and a tubular portion 232 continuous with the rectangular end face portion 231 and to be mounted to one end side of the frame portion 21 and the cell 20.

The end face portion 231 of the cap portion 23 is provided with a plurality of terminal windows 233 on which the terminal contact portions 222 of the circuit board portion 22 are to front. In addition, the upper and lower surfaces of the tubular portion 232 are provided with a plurality of pawl engaging holes 234 for engagement with a plurality of the cap portion lock pawls 219 provided in the upper-lower pair of the cap support portions 218 of the frame portion 21.

In addition, as shown in FIGS. 13 and 14, the frame portion 21 includes a plurality of projections 218a projecting to the circuit board portion 22 side, at the upper-lower pair of the cap support portions 218. The projections 218a are so designed that they come into contact with the portion, where electronic component parts or the like are not mounted, of the circuit board portion 22 at a position for interposing the transfer mold 223 therebetween at the time when the terminal contact portions 222 of the circuit board portion 22 are pressed by the opponent terminals or in other similar situations.

The enveloping film 24 is formed in a sheet-like shape with a thickness of about 0.05 to 0.1 mm from a synthetic resin such as polyethylene (PE), polyethylene terephthalate (PET), polycarbonate (PC), etc. The cell 20 is stored in the frame portion 21, the circuit board portion 22 and the like are mounted to the frame portion 21, the cap potion 23 is put thereon, and then the enveloping film 24 is wrapped around the frame portion 21 to cover the face and back surfaces of the cell 20 and to integrally unite the cell 20, the frame portion 21, and the cap portion 23. Incidentally, a nameplate film 25 is adhered to the enveloping film 24.

In addition, the frame portion 21 is provided at an edge portion of its side 21b with projected portions 26 and 27 projected in the length direction of the side, whereby misinsertion of the battery 2 into the image pickup apparatus 1 can be prevented. In the present embodiment, the projected portions 26 and 27 are different from each other in sectional shape and size.

The projected portion 26 is formed in a roughly rectangular parallelopiped shape, as shown in FIGS. 13 and 14. In this case, a side surface of the image pickup apparatus 1 is provided with a cutout portion 122 so that, when the battery 2 is mounted in the image pickup apparatus 1, the battery 2 is contained in the condition where the projected portion 26 is exposed. The cutout area of the cutout portion 122 is set to be not less than the installation area of the projected portion 26 relative to the frame portion 21 of the battery 2.

The projected portion 27 is formed to be roughly trapezoidal in section and has an inclined surface 270, as shown in FIGS. 13 and 14. Further, the projected portion 27 is provided with a locked surface 271 on which the lock pawl 115 slides when the battery 2 is mounted in the image pickup apparatus 1 and the lock pawl 115 locks the battery 2.

The locked surface 271 is set to be smaller in height than the surface of the frame portion 21, whereby the portion to be locked by the lock pawl 115 is clearly visible. Simultaneously, the locked surface 271 is so set that the lock pawl 115 receiving a contact pressure of the spring 115b is restrained. In addition, the locked surface 271 is lower in coefficient of friction than that of the peripheral portion. This ensures that the portion to be locked is further clearly recognized. Further, is achieved swiftly.

Now, an operation of inserting the battery 2 will be described referring to FIGS. 17 to 20.

Figure 18A:
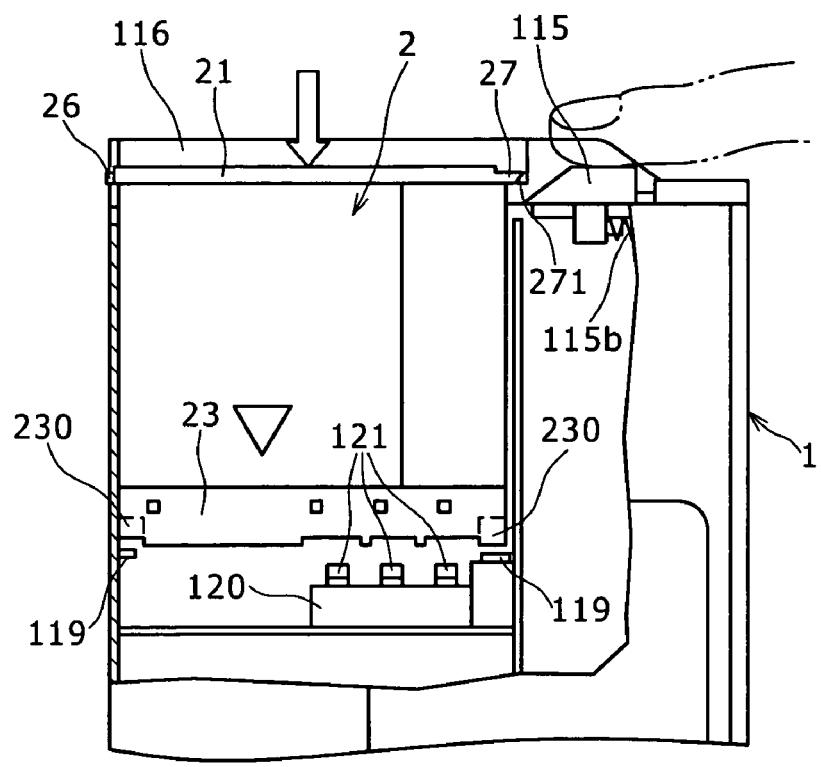
FIGS. 18A to 18C illustrate a battery inserting operation.
Figure 18B:
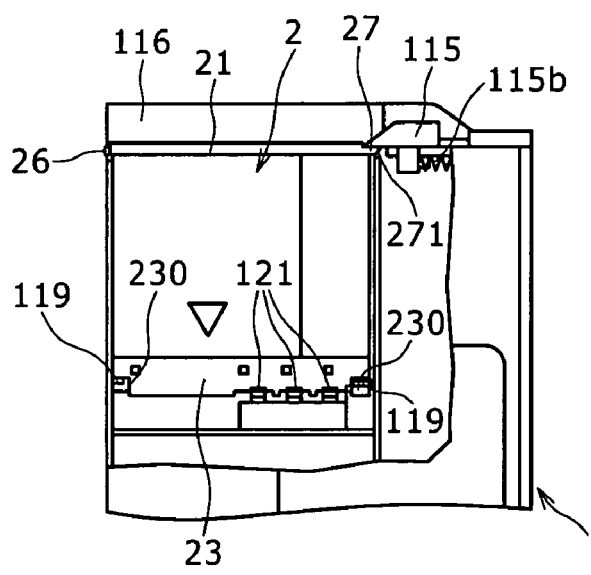
Figure 18C:
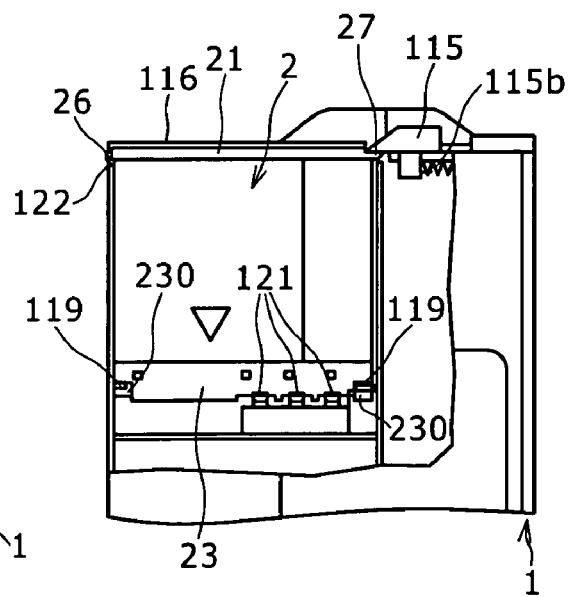

As shown in FIG. 17, the battery 2 is inserted into the image pickup apparatus 1, with its surface having the terminal contact portions 222 directed toward the opening portion 118 of the image pickup apparatus 1. In this instance, as shown in FIG. 18A, the battery 2 is inserted into the image pickup apparatus 1 in the condition where the lock pawl 115 is pulled by a finger. Then, as shown in FIG. 18B, the finger is put off the lock pawl 115 to release the lock pawl 115 when a bottom portion of the recessed portion 230 of the battery 2 comes into contact with the rib 119 in the image pickup apparatus 1 and the battery 2 is contained in the image pickup apparatus 1, whereupon the lock pawl 115 slides on the locked surface 271 toward the battery 2 by the contact pressure of the spring 115b, and the locked surface 271 is locked, whereby the battery 2 is locked. Thereafter, as shown in FIG. 18C, the lid 116 is closed, whereby the battery 2 is sealed in the image pickup apparatus 1. In this instance, the terminals 121 provided on the terminal plate 120 of the image pickup apparatus 1 are electrically connected to the terminal contact portions 222 of the battery 2, in the state of being compressed by elastic deformation.

Figure 19A:
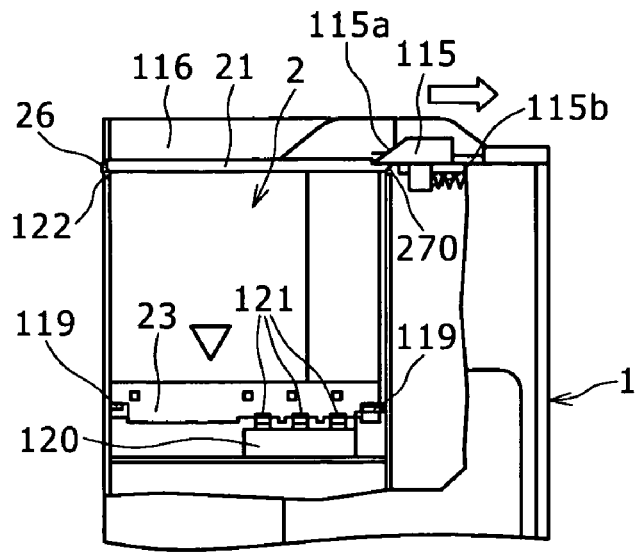
FIGS. 19A to 19C illustrate a battery discharging operation.
Figure 19B:
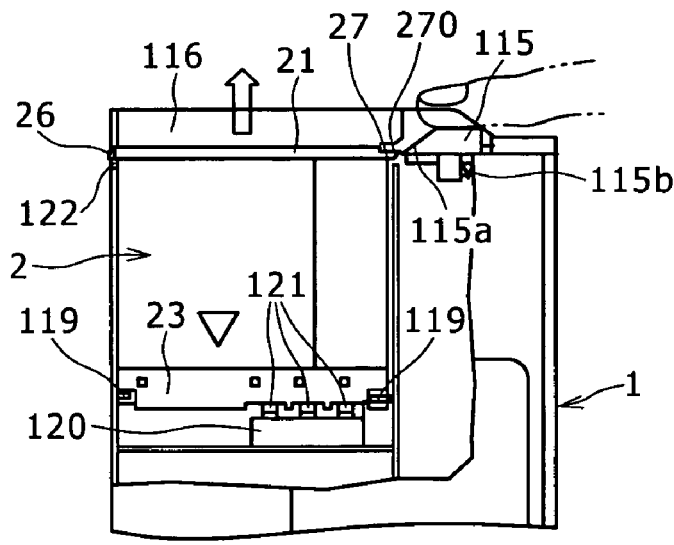
Figure 19C:
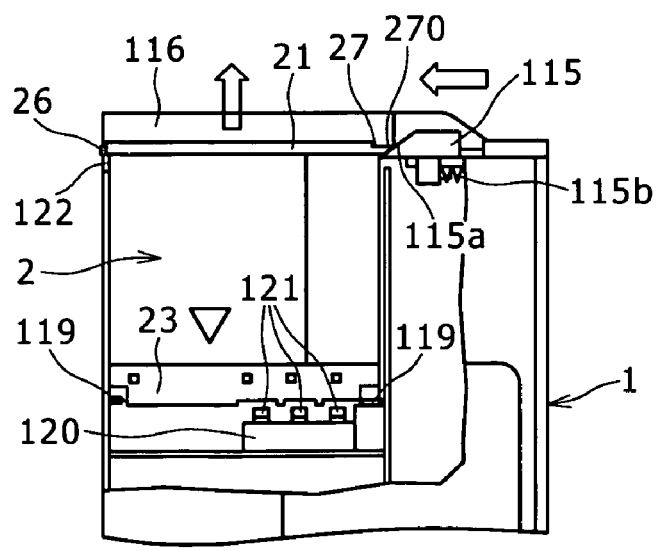

Next, in the case of taking the battery 2 out, the lock pawl 115 is drawn near in the horizontal direction of arrow by a finger (not shown) as shown in FIG. 19A, whereon the battery 2 is projected in the direction of arrow under the contact pressure of the terminals 121 on the terminal plate 120 as shown in FIG. 19B. Here, when the finger is put off the lock pawl 115 to release the lock pawl 115, the lock pawl 115 is energized by the spring 115b biasing the lock pawl 115 toward the opening portion 118 (FIG. 17), and is moved in the horizontal direction of arrow as shown in FIG. 19C. In this case, since the projected portion 26 of the battery 2 is exposed to the outside of the image pickup apparatus 1, the battery 2 can be easily taken out by putting fingers on the projected portions 26 and 27. Incidentally, in the case where the lock pawl 115 is provided with the inclined surface 115a, the lock pawl 115 comes under the projected portion 27 while keeping its inclined surface 115a in contact with the inclined surface 270 of the projected portion 27, so that the discharge amount of the battery 2 is augmented, and the battery 2 is projected further. As a result, the battery 2 can be taken out more easily.

Figure 20A:
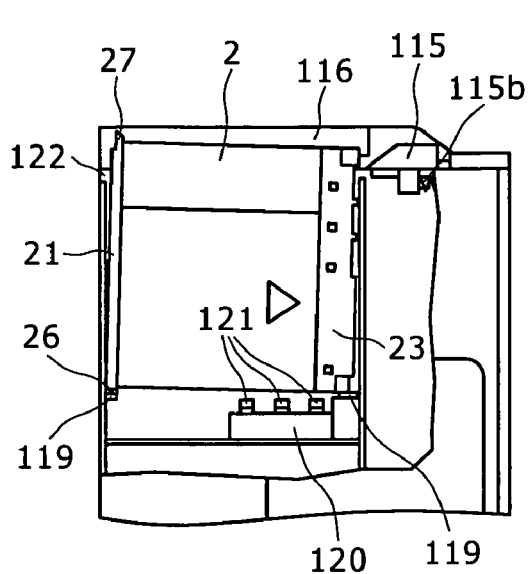
FIGS. 20A to 20D illustrate a battery mis-insertion preventive operation.
Figure 20C:
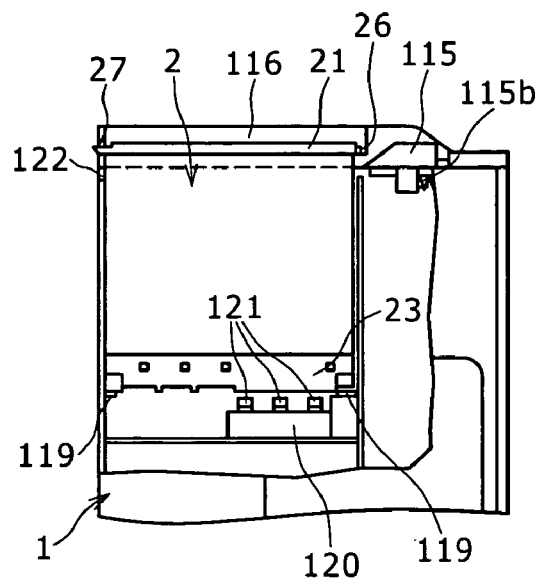
Figure 20B:
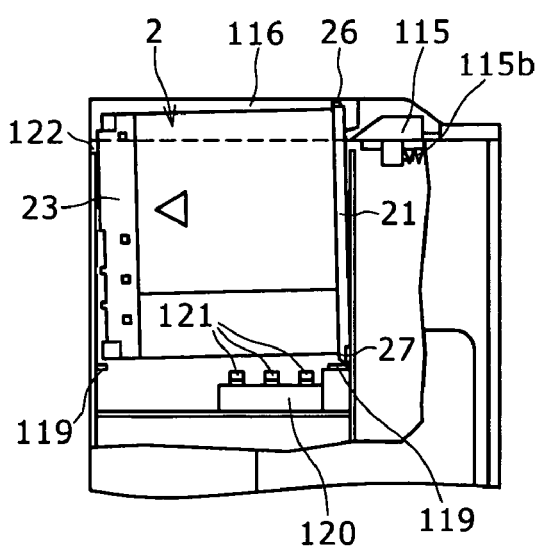

On the other hand, in the case where the battery 2 is misinserted sideways relative to the image pickup apparatus 1 as shown in FIGS. 20A and 20B, the projected portion 26 of the battery 2 abuts on the rib 119, and a side surface of the cap portion 23 abuts on the rib 119. In this instance, since a part of the battery 2 is located outside the main body of the image pickup apparatus 1, the lock pawl 115 cannot lock the battery 2, and the lid (door) 116 cannot shut up the opening portion 118.

In addition, when the battery 2 is inserted face side back into the image pickup apparatus 1 as shown in FIG. 20C, an end portion of the cap portion 23 of the battery 2 abuts on the ribs 119. In this case, also, since a part of the battery 2 is located outside the main body of the image pickup apparatus 1, the lock pawl 115 cannot lock the battery 2, and the lid (door) 116 cannot shut up the opening portion 118.

Figure 20D:
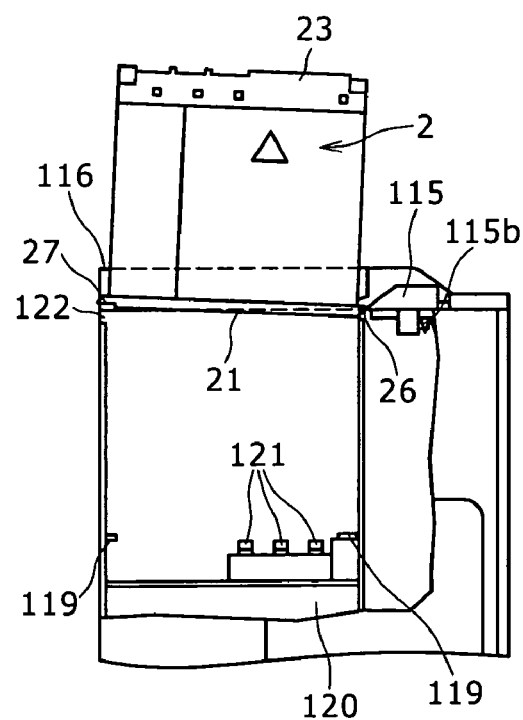

Furthermore, when the battery 2 is about to be inserted front side back into the image pickup apparatus 1 as shown in FIG. 20D, the projected portions 26 and 27 of the battery 2 abut on edge portions of the opening portion 118 of the image pickup apparatus 1, and the battery 2 cannot be inserted into the image pickup apparatus 1, so that the lock pawl 115 cannot lock the battery 2, and the lid (door) 116 cannot shut up the opening portion 118.

Thus, according to the battery 2, mis-insertion thereof into the image pickup apparatus 1 is prevented, and breakage of the terminals 121 of the image pickup apparatus 1 due to mis-insertion of the battery 2 can be obviated.

Besides, as in the case of a battery 2A according to an embodiment shown in FIGS. 21A to 21F, projected portions 28 and 29 projected in the insertion direction and different in shape may be formed at both end portions of the cap portion 23 of the battery 2 to thereby prevent mis-insertion of the battery 2A into the image pickup apparatus 1. In this embodiment, also, the projected portion 28 and the projected portion 29 are different from each other in sectional shape and size. Specifically, the projected portion 28 is formed to be roughly trapezoidal in section, whereas the projected portion 29 is formed in a roughly rectangular parallelopiped shape.

The operation of inserting this battery 2A will be described referring to FIGS. 21 to 23.

Figure 22:
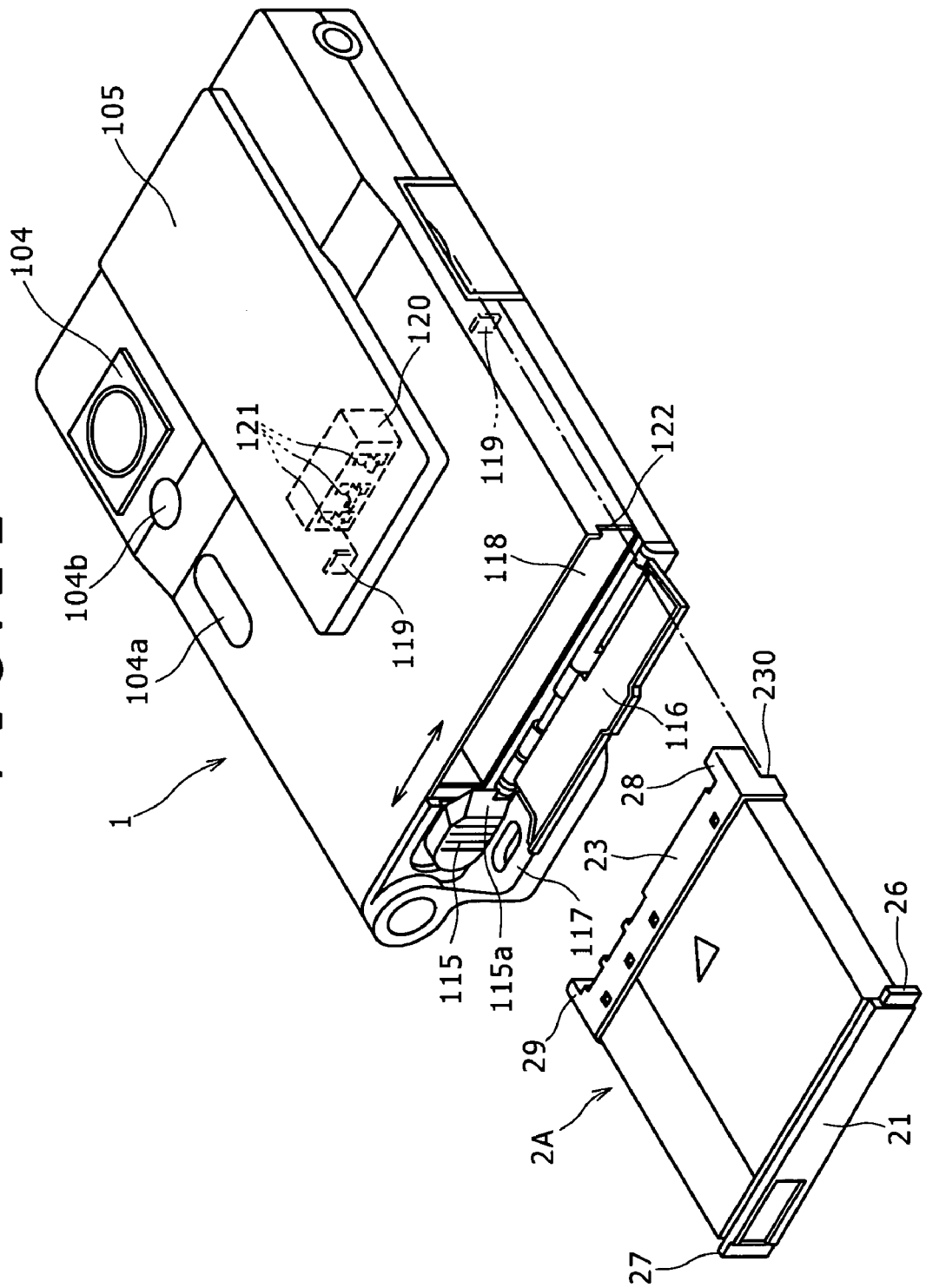
FIG. 22 illustrates the points in inserting the battery into the image pickup apparatus.

In the condition where the lock pawl 115 is drawn near in the direction of arrows by a finger as shown in FIG. 22, the battery 2A is inserted into the image pickup apparatus 1, with the surface having a terminal window 233 of the battery 2A directed toward the opening portion 118 of the image pickup apparatus 1. Then, as shown in FIG. 23A, the finger is put off the lock pawl 115 to release the lock pawl 115 when a bottom portion of the recessed portion 230 of the battery 2A comes into contact with the rib 119 in the image pickup apparatus 1 and the battery 2A is contained in the image pickup apparatus 1, whereupon the lock pawl 115 slides on the locked surface 271 toward the battery 2A under a contact pressure of the spring 115b, to lock the locked surface 271, whereby the battery 2 is locked. Thereafter, the lid 116 is closed, whereby the battery 2A is sealed in the image pickup apparatus 1. In this case, the terminals 121 provided on the terminal plate 120 of the image pickup apparatus 1 are electrically connected to the terminals 222 of the battery 2A, in the state of being compressed by elastic deformation.

On the other hand, in the case where the battery 2A is inserted face side back into the image pickup apparatus 1 as shown in FIG. 23B, the projected portions 28 and 29 of the battery 2A abut on the ribs 119. In this instance, since a part of the battery 2A is located outside the main body of the image pickup apparatus 1, the lock pawl 115 cannot lock the battery 2A, and the lid (door) 116 cannot shut up the opening portion 118. Further, a distance is maintained between the cap portion 23 of the battery 2A and the terminals 121 on the image pickup apparatus 1 side so that they do not make contact with each other.

In addition, when the battery 2A is about to be mis-inserted sideways into the image pickup apparatus 1 as shown in FIG. 23C, the projected portion 28 of the battery 2A abuts on an edge portion of the opening portion 118 of the image pickup apparatus 1, and the battery 2A cannot be inserted into the image pickup apparatus 1, so that the lock pawl 115 cannot lock the battery 2A, and the lid (door) 116 cannot shut up the opening portion 118.

Thus, according to the battery 2A, mis-insertion thereof into the image pickup apparatus 1 is prevented, and breakage of the terminals 121 of the image pickup apparatus 1 due to mis-insertion of the battery 2A can be obviated.

In addition, even in a battery whose principal surface is nearly square, like the batteries 2 and 2A, mis-insertion of the battery is prevented from occurring, it is possible to protect the battery and the terminals of the apparatus to be loaded with the battery, to reduce the size of the apparatus, and to enhance the degree of freedom in the actual mounting.

Therefore, the image pickup apparatus 1 can be detachably loaded with the power supply unit as shown in FIGS. 1 to 4 while making it possible to prevent mis-insertion, and the function of the image pickup apparatus 1 can be extended in a compact form.

FIG. 1 schematically shows the power supply unit including a high-capacity battery.

Figure 5:
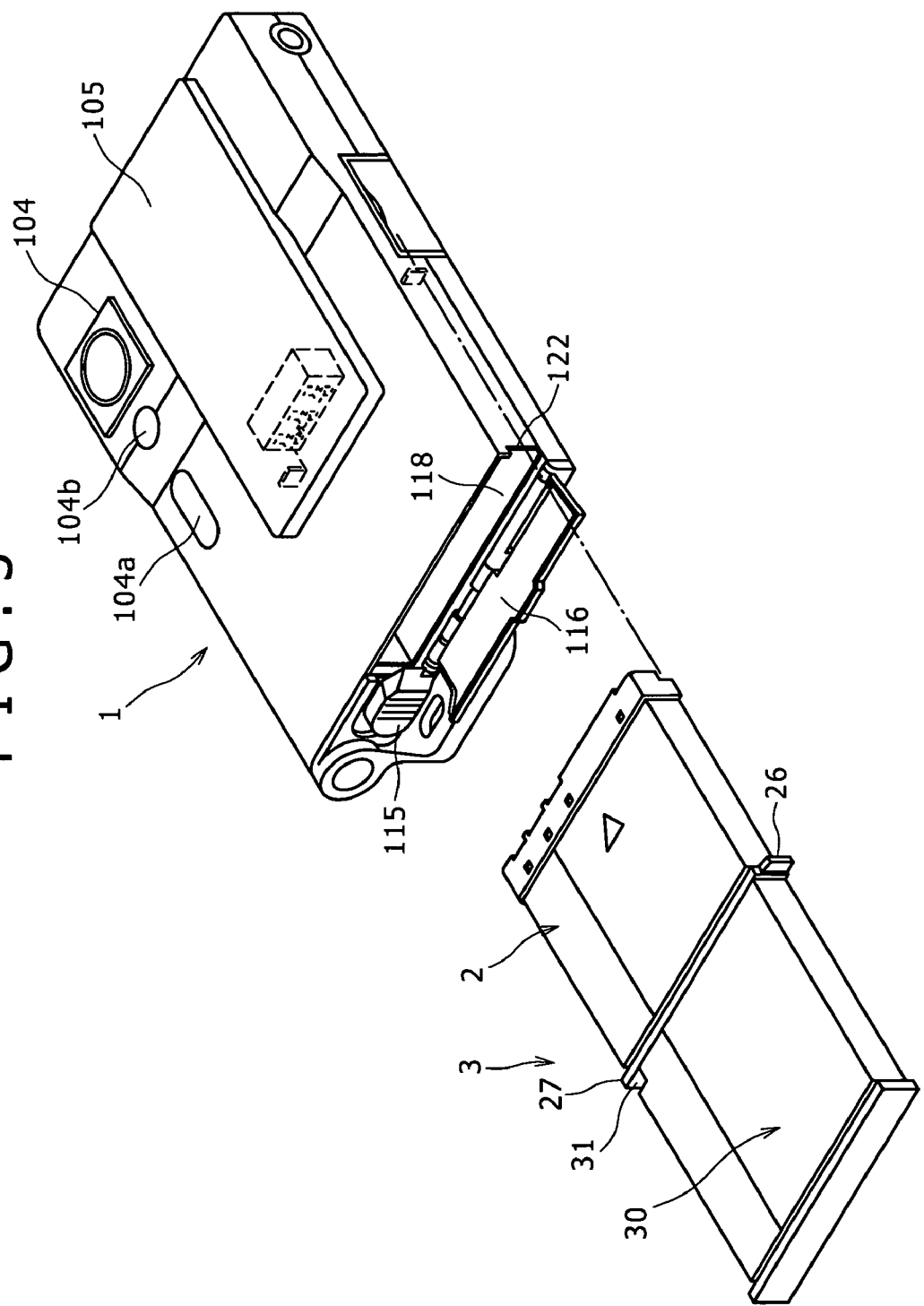
FIG. 5 illustrates the points in inserting a high-capacity battery into an image pickup apparatus.
Figure 6:
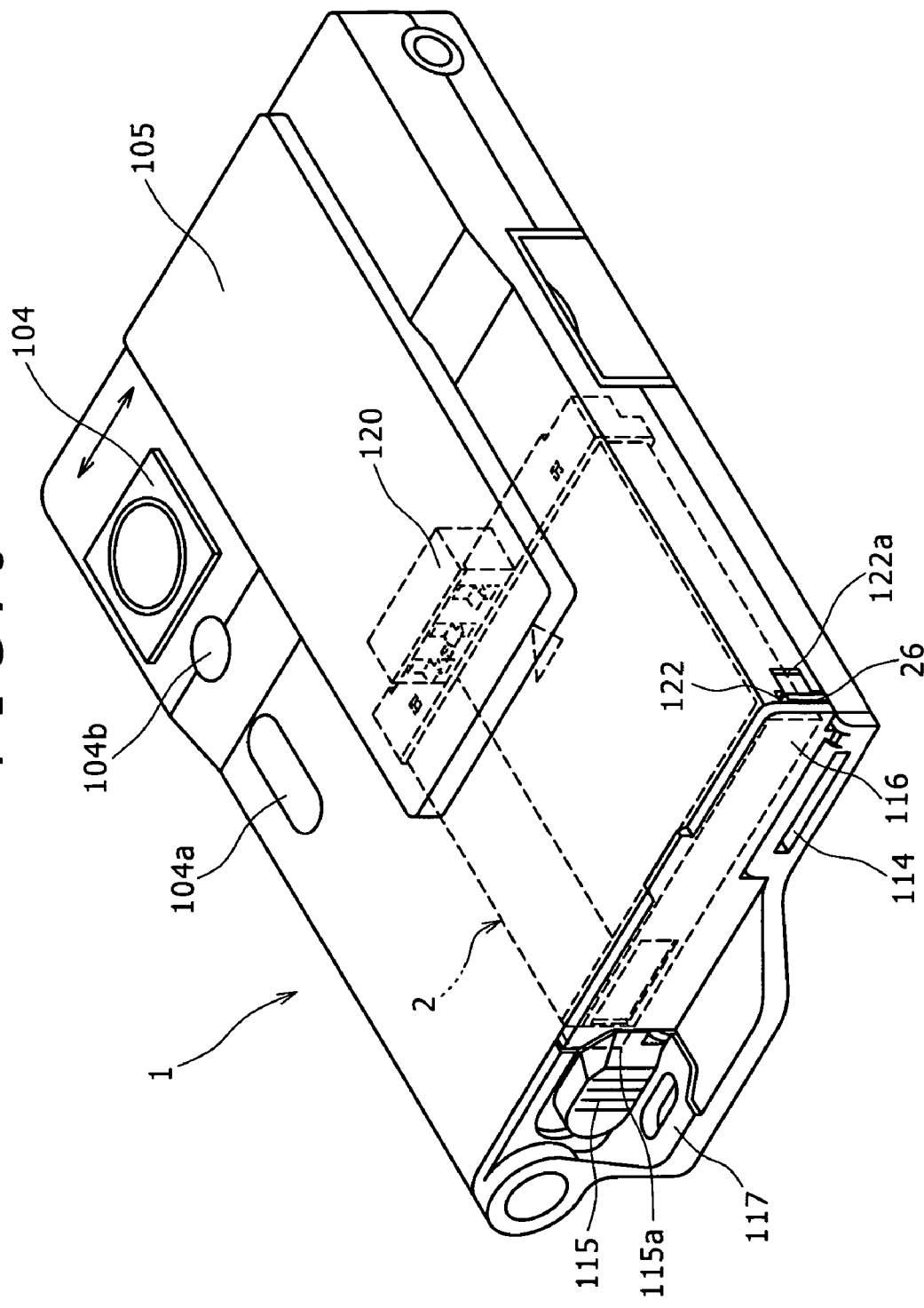
FIG. 6 schematically shows the image pickup apparatus formed with a cable draw-out port.

The power supply unit 3 includes the battery 2 and an extension battery 30, and has a battery higher in capacity than the battery 2. The extension battery 30 is configured in the same manner as the battery 2, and is provided in a frame 21 on the back side of the battery 2. The extension battery 30 is electrically connected in parallel with the battery 2. A connection portion between the battery 2 and the extension battery 30 is provided with a locked portion 31 to be locked by a lock pawl 115 of an image pickup apparatus 1. When the battery 2 is inserted into the image pickup apparatus 1 according to the procedure shown in FIG. 5, the power supply unit 3 is mounted to the image pickup apparatus 1 in the condition where the locked portion 31 and a projected portion 27 are locked by the lock pawl 115 and a projected portion 26 of the battery 2 is stored in a cutout portion 122. Thus, according to the power supply unit 3, the image pickup apparatus 1 can utilize a battery higher in capacity than the existing battery, while maintaining the thinness of a main body 10 (FIG. 12) thereof.

Figure 2:
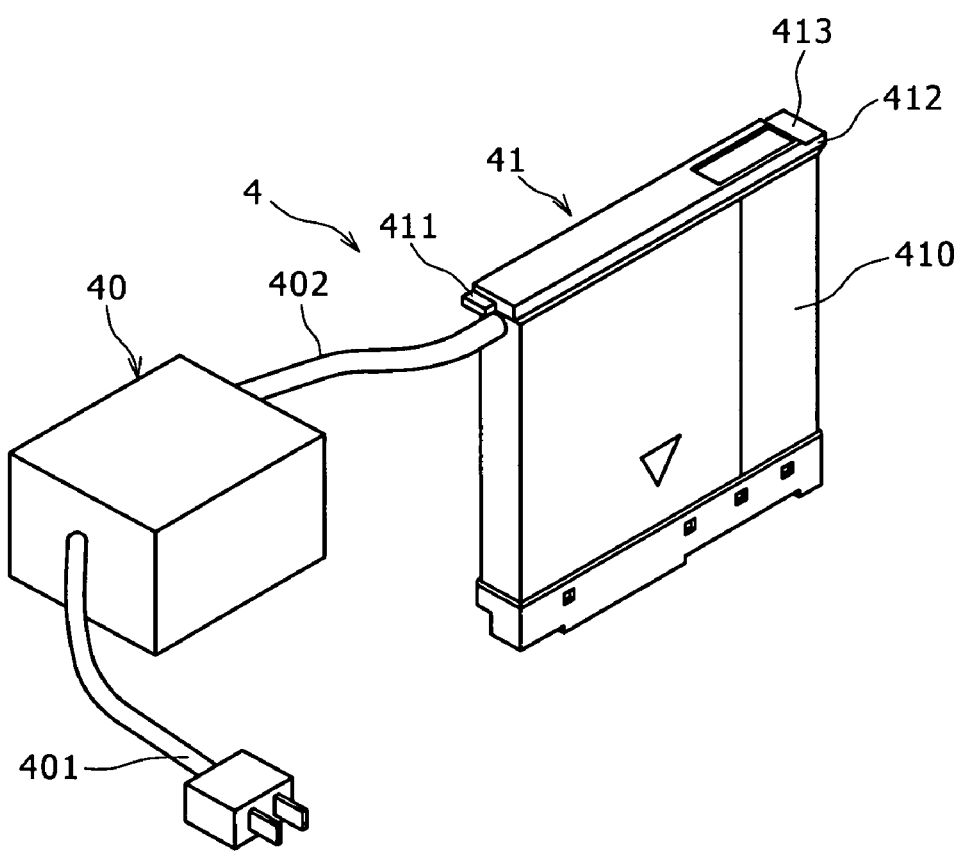
FIG. 2 schematically shows an embodiment of the power supply unit according to the present invention.

FIG. 2 schematically shows a power supply unit utilizing an AC power supply.

Figure 9:
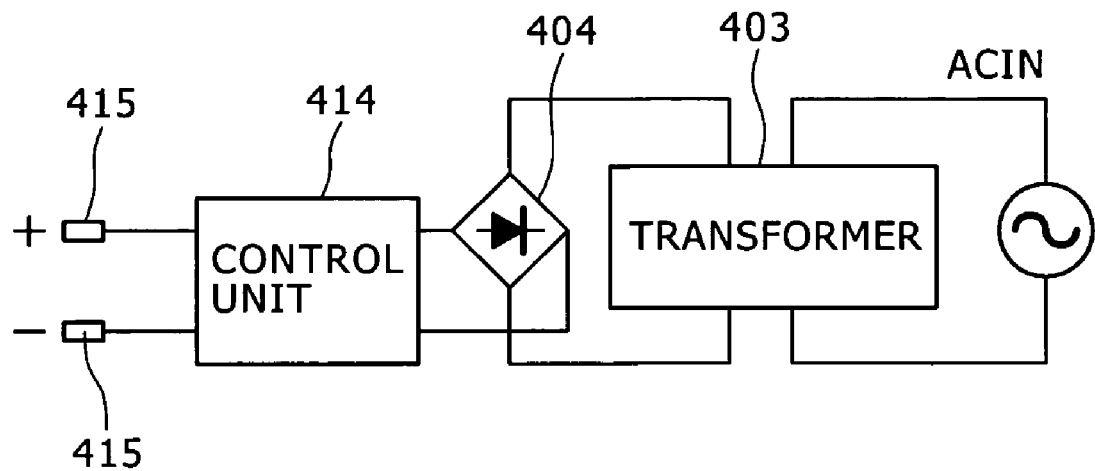
FIG. 9 is an electric circuit diagram concerning a DC plate.

The power supply unit 4 includes an AC adaptor 40 for outputting a DC power supply, and a DC plate 41 having DC terminals for connecting the DC power supply to the image pickup apparatus 1. The AC adaptor 40 includes a transformer 403 and a rectifying circuit 404, shown in FIG. 9, and has cables 401 and 402. The cable 401 has a consent plug for connection to an AC power supply. The cable 402 provides electrical connection between the AC adapter 40 and the DC plate 41. A casing 410, formed in the same shape as that of the battery 2, of the DC plate 41 stores therein a control unit 414 for controlling the DC voltage of the AC adaptor 40, and includes terminals 415 for supplying the controlled DC voltage to the image pickup apparatus 1, as shown in FIG. 9.

In addition, the cable 402 is connected to the vicinity of a projected portion 411 on a side surface of the casing 410. In this case, a cutout portion 122 on the image pickup apparatus 1 side is provided with a cable draw-out port 122a for leading out the cable 402 when the casing 410 is mounted in the image pickup apparatus 1. When the casing 410 is mounted in the image pickup apparatus 1, a locked surface 413 formed in a projected portion 412 of the casing 410 is locked by a lock pawl 115, and the projected portion 411 is stored in the cutout portion 122, whereby the power supply unit 4 is provided in the image pickup apparatus 1. In this instance, the cable 402 is in the state of being drawn out via the cable draw-out port 122a. Thus, according to the power supply unit 4, the image pickup apparatus 1 can utilize an AC power supply while maintaining the thinness of a main body 10 (FIG. 12) thereof.

Figure 3:
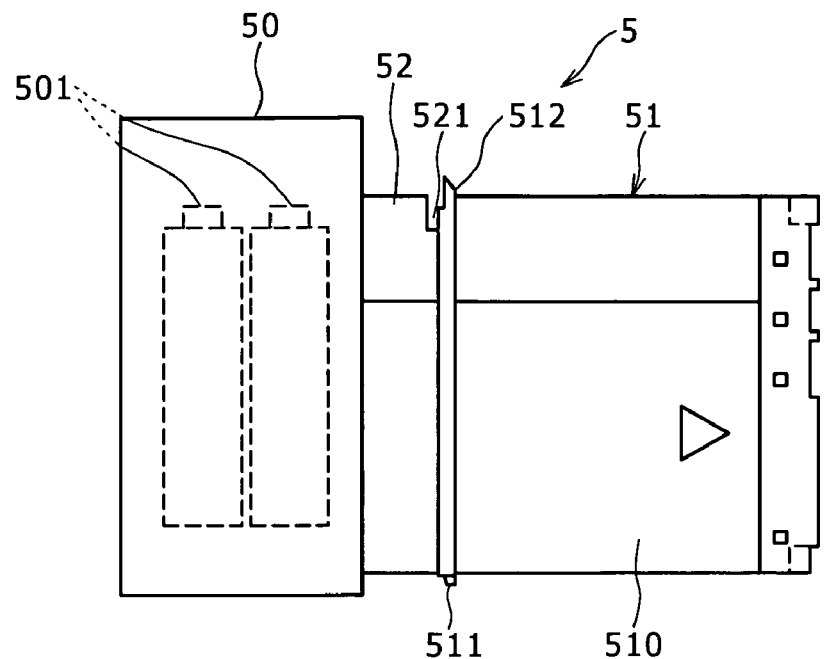
FIG. 3 schematically shows an embodiment of the power supply unit according to the present invention.

FIG. 3 schematically shows a power supply unit utilizing a primary cell or a secondary cell.

Figure 10:
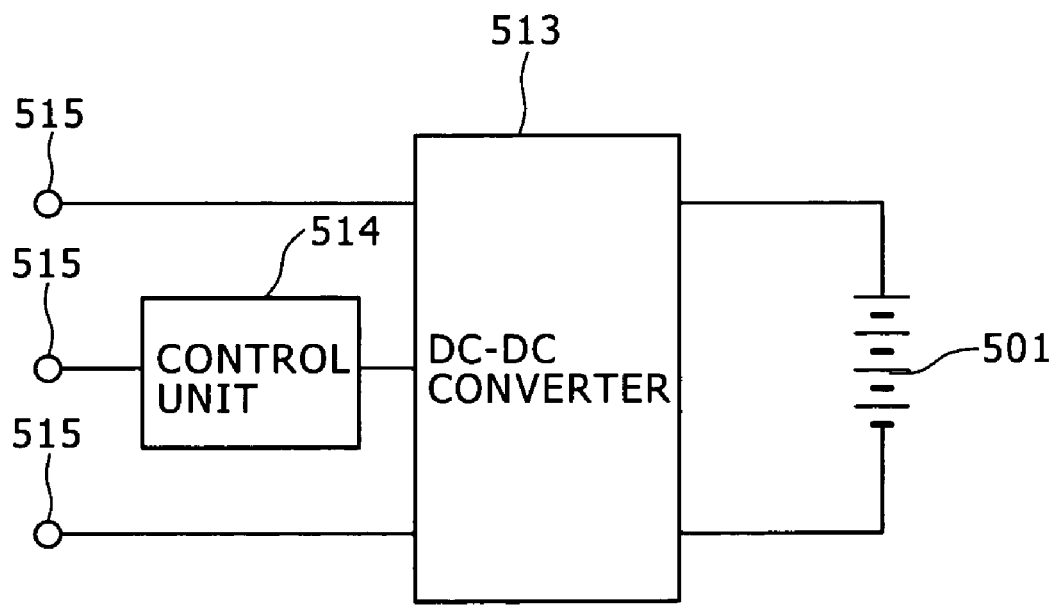
FIG. 10 is an electric circuit diagram concerning the cell incorporating grip.

The power supply unit 5 includes a cell-incorporating grip 50, and a DC plate 51 for electrically connecting the cell-incorporating grip 50 to an image pickup apparatus 1. The cell-incorporating grip 50 is unloadably loaded with a plurality of cells (primary cells or secondary cells) 501. The cell-incorporating grip 50 and the DC plate 51 are connected to each other, with a certain distance therebetween, by a connection casing 52. The DC plate 51 has a casing 510 formed in the same shape as that of the battery 2; a DC-DC converter 513, a control circuit 514 and terminals 515 for electrically connecting the cells 501 and the image pickup apparatus 1 to each other and for controlling the supply voltage, as shown in FIG. 10, are provided inside the casing 510. A locked portion 521 is formed in the connection portion of the connection casing 52 and DC plate 51 to be locked by a lock pawl 155 of the image pickup apparatus. When the DC plate 51 is inserted into the image pickup apparatus 1 according to the procedure shown in FIG. 7, the locked portion 521 and a projected portion 512 of the DC plate 51 are locked by the lock pawl 155, and a projected portion 511 of the DC plate 51 is stored in a cutout portion 122, whereby the power supply unit 5 is provided in the image pickup apparatus 1. Thus, according to the power supply unit 5, the image pickup apparatus 1 can utilize primary cells or secondary cells while maintaining the thinness of a main body 10 (FIG. 12) thereof. Examples of the primary cells or secondary cells include the known ones adopted for use in portable-type apparatuses and the like. Incidentally, while the cell-incorporating grip 50 shown incorporates four cells 501 therein, the number of the cells 501 incorporated is not limited to four, and an appropriate plurality of cells 501 may be stored in the grip 50.

Figure 4:
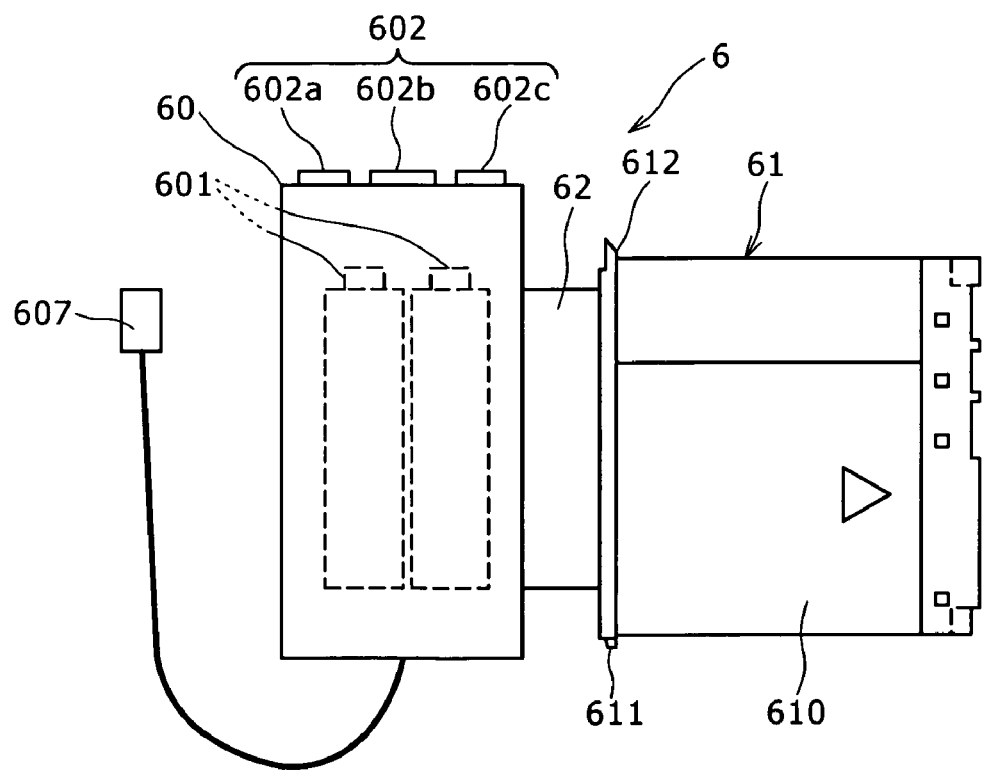
FIG. 4 schematically shows an embodiment of the power supply unit according to the present invention.

FIG. 4 schematically shows a power supply unit which can utilize an external control function of an image pickup apparatus 1.

The power supply unit 6 includes a control grip 60, and a DC plate 61 for electrically connect the control grip 60 to an image pickup apparatus 1. The control grip 60 detachably incorporates a plurality of cells (primary cells or secondary cells) 601 therein, and is provided with a control portion 602 including a power supply button 602a, a shutter button 602b, a zoom switch 602c and the like. Incidentally, while the control portion 602 shown in FIG. 4 includes the power supply button 602a, the shutter button 602b and the zoom switch 602c, the configuration of the control portion 602 is not limited to this, and may include any one of the power supply button 602a, the shutter button 602b and the zoom switch 602c. Or, the control portion 602 may include the power supply button 602a and the shutter button 602b. Or, the control portion 602 may include the power supply button 602a and the zoom switch 602c. Or, the control portion 602 may include the shutter button 602b and the power supply button 602a. Further, the control portion 602 may include any one or appropriate ones selected from the group consisting of a mode changeover switch 106, a menu button 108, a control button 109, a screen display button 110, a screen size selection/screen deletion button 111, a reset button 113, a control button 109 and the like, as has been above-mentioned.

Figure 11:
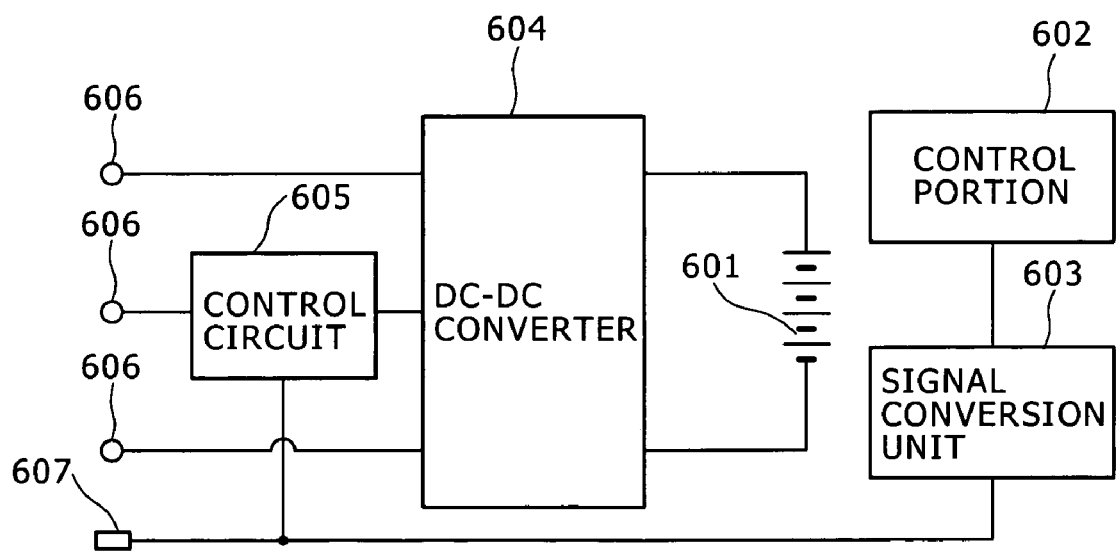
FIG. 11 is an electric circuit diagram concerning the operating grip.

The control grip 60 and the DC plate 61 are connected to each other, with a certain spacing therebetween, by a connection portion 62. The DC plate 61 has a configuration in which a circuit including a signal conversion unit 603, a DC-DC converter 604, a control circuit 605 and terminals 606 for electrically connecting cells 601, the control portion 602 and the image pickup apparatus 1 to one another and for controlling the image pickup apparatus 1, as shown in FIG. 11, is contained in a casing 610 formed in the same shape as that of the battery 2. While control signals are supplied via the terminals 606 in the circuit shown, the control signals supplied from the signal conversion unit 603 may be supplied to the image pickup apparatus 1 via a plug 607 shown in the figure. In this case, the plug 607 is connected to a multiple terminal 114 of the image pickup apparatus 1. Incidentally, the connection portion 62 may be so designed that it can be rotated within a predetermined angle relative to the control grip 60, thereby adding a tilting function to the image pickup apparatus 1.

Besides, since the DC plate 61 is formed in the same shape as that of the battery 2, it has a projected portion 612 to be locked by the lock pawl 115 of the image pickup apparatus 1. Therefore, when the DC plate 61 is inserted into the image pickup apparatus 1 according to the procedure shown in FIG. 8, the projected portion 612 is locked by the lock pawl 115, and the projected portion 611 of the DC plate 61 is stored in the cutout portion 122, whereby the power supply unit 6 is provided in the image pickup apparatus 1.

Thus, according to the power supply unit 6, the image pickup apparatus 1 can be controlled through the control grip 60, which is an external control means, while maintaining the thinness of a main body 10 (FIG. 12) thereof.

While the batteries and the power supply units described in the above embodiments are applied to the image pickup apparatus, the batteries and the power supply unit are applicable also to other apparatuses needing batteries than the image pickup apparatus.

It should be understood to those skilled in the art that various modifications, combinations, sub-combinations and alterations may occur depending on design requirements and other factors insofar as they are within the scope of the appended claims or the equivalents thereof.

What is claimed is:

1. A power supply unit, comprising:
a first flat roughly rectangular parallelopiped battery inserted in an apparatus;
a second battery electrically connected to a back surface of the first battery, the back surface being opposite to an insertion surface of the first battery;
projected portions at both ends of the back surface in a longitudinal direction thereof, the projected portions being projected in opposite directions, the projected portions being exposed to an outside of the apparatus, and one of the projected portions including a locked surface; and
locked portions, locked by the apparatus, at connection portions of the first and second batteries,
wherein mis-insertion of the first battery into the apparatus is prevented, and
wherein the apparatus is supplied with a greater capacity of battery power supply than that of the first battery.

2. A power supply unit, comprising:
a flat roughly rectangular parallelopiped battery inserted in an apparatus for supplying power to the apparatus;
a detachable power supply electrically connected to the battery through a DC plate having a DC terminal in the same shape as the battery, the DC plate being attached to a back surface of the battery, and the back surface being opposite to an insertion surface of the battery; and
projected portions at both ends of the back surface of the battery in a longitudinal direction thereof, one of the projected portions being provided with a locked surface locked by the apparatus, and the projected portions being exposed to an outside of the apparatus, whereby mis-insertion of the battery into the apparatus is prevented, and a function of the apparatus is extended.

3. The power supply unit as set forth in claim 2, wherein the power supply can convert a commercial power supply to a DC power supply.

4. The power supply unit as set forth in claim 3, wherein the power supply includes an AC adapter for converting the commercial power supply to the DC power supply, wherein the AC adapter is electrically connected to a vicinity of the other one of the projected portions of the DC plate through a cable, and wherein the cable can be drawn out through a cutout portion provided in the apparatus for storing and exposing the other one of the projected portions when the DC plate is mounted to the apparatus.

5. The power supply unit as set forth in claim 2, wherein the power supply includes a grip with a cell, the grip detachably including a primary cell or a secondary cell as the cell.

6. The power supply unit as set forth in claim 2, wherein the power supply includes a grip with a cell for operating the apparatus, the grip detachably including a primary cell or a secondary cell as the cell.

7. The power supply unit as set forth in claim 1, wherein the first battery has a roughly square principal surface.

8. The power supply unit as set forth in claim 2, wherein the first battery has a roughly rectangular principal surface.

* * * * *